United States Patent [19]

Martin

[11] 3,904,667

[45] Sept. 9, 1975

[54] 4-HALO-2,5-DIALKYL-BENZENEACETONITRILES
[75] Inventor: Elmore Louis Martin, Wilmington, Del.
[73] Assignee: E. I. Du Pont de Nemours and Company, Wilmington, Del.
[22] Filed: Apr. 6, 1972
[21] Appl. No.: 241,836

[52] U.S. Cl.............................. 260/465 G; 71/105
[51] Int. Cl.$^2$....................................... C07C 121/66
[58] Field of Search................................ 260/465 G

[56] References Cited
UNITED STATES PATENTS
3,027,248  3/1962  Koopman et al. .................... 71/105
3,476,790  11/1969  Barch............................. 260/465 X FOREIGN PATENTS OR APPLICATIONS
760,968  6/1971  Belgium Primary Examiner—Elbert L. Roberts
Assistant Examiner—Dolph H. Torrence

[57] ABSTRACT

Certain novel alkylated halobenzeneacetonitriles and halomethylbenzeneacetonitriles are effective selective herbicides that can be used in the presence of crops such as corn and soybeans.

3 Claims, No Drawings

4-HALO-2,5-DIALKYL-BENZENEACETONITRILES

BACKGROUND OF THE INVENTION

This invention relates to a class of substituted benzeneacetonitriles, to their use as selective herbicides, and to herbicidal compositions containing them as active compounds.

Belgian Pat. No. 760,968 dated June 29, 1971, discloses 2-alkyl-3-halobenzeneacetonitriles. These benzeneacetonitriles have plant growth regulating and herbicidal activity.

Dutch patent application No. 64,10206 discloses 2,3-dichlorobenzeneacetonitriles as herbicides.

SUMMARY OF THE INVENTION

According to this invention, there is provided a class of compounds effective as selective herbicides in crops. The novel compounds of the present invention are represented by the general formula (1) below:

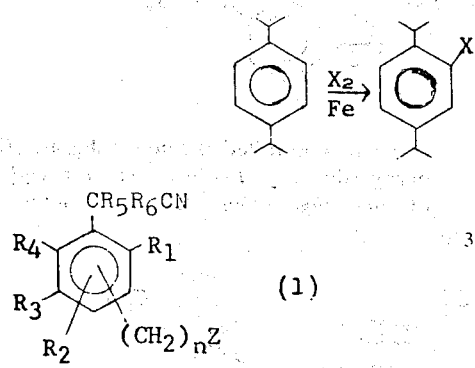

where:
each of $R_1$, $R_2$, $R_3$ and $R_4$ independently is hydrogen, a $C_1$–$C_7$ alkyl, a halogen, or a nitro group;
each of $R_5$ and $R_6$ independently is hydrogen or methyl;
Z is halogen; and
$n$ is 0 or 1;
provided that:
a. at most two of $R_1$, $R_2$, $R_3$, and $R_4$ are nitro groups;
b. at most two of $R_1$, $R_2$, $R_3$, and $R_4$ are halogens;
c. at least one of $R_1$, $R_2$, $R_3$, and $R_4$ is hydrogen or halogen;
d. at least two of $R_1$, $R_2$, $R_3$, and $R_4$ are $C_2$–$C_7$ alkyls;
e. each alkyl has at most three carbon atoms in a straight chain from the point of attachment to the aromatic ring;
f. the nitro groups are not ortho to each other;
g. the alkyl groups are not ortho to each other; and
h. when $n$ is 1, both $R_5$ and $R_6$ are hydrogens.

Preferred because of higher activity are compounds of formula (1) wherein both $R_5$ and $R_6$ are hydrogens, and $n$ is 0. Within this preferred class, the most active and the easiest to synthesize are those compounds in which two of $R_1$, $R_2$, $R_3$, and $R_4$ are $C_2$–$C_5$ alkyl groups, and the other two are hydrogens.

Compositions containing the benzeneacetonitriles of this invention can be used in the presence of valuable crops, such as corn and soybeans.

DESCRIPTION OF THE INVENTION

Compounds of formula (1)($n = 0$) can be prepared by one or more methods using reactions generally known in the art. Simple halobenzeneacetonitriles can be made, for instance, by halogenation of the corresponding dialkylbenzenes, chloromethylation of the resulting halodialkylbenzenes, and replacement of the benzylic chlorine with a cyano group, as shown in the following scheme:

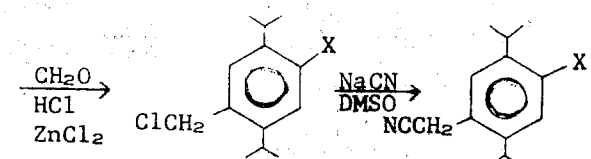

X = halogen;
DMSO = dimethyl sulfoxide

Such reactions are described, for instance, in the following references: G. A. Olah — Friedel Crafts and Related Reactions, II, Part 2, Chapter 21, and Fuson and Corse, J. Am. Chem. Soc., 60, 2063 (1938).

The halobenzeneacetonitrile can be nitrated to a mononitro compound, e.g.

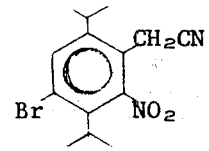

Nitration is carried out by well-known methods, concentrated nitric acid being a suitable nitrating agent, cf. Org. Syn. Coll. Vol. II, 254 (1943).

Dihalobenzeneacetonitriles can be obtained from the dialkylbenzyl halides, as shown below:

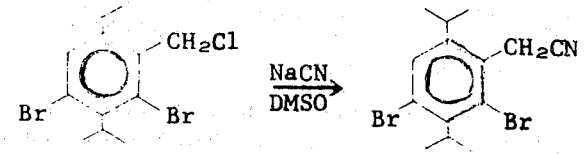

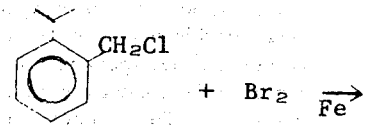

DMSO = dimethyl sulfoxide

Compounds of formula (1)($n = 1$) can also be prepared using reactions generally known in the art. The simple halomethylbenzeneacetonitriles can be made by first halomethylating a benzeneacetamide and then dehydrating the product with a suitable dehydrating agent such as phosphorous oxychloride or thionyl chloride. For further details see G. A. Olah — Friedel Crafts and Related Reactions, II, Part 2, Chapter 21, and A. Surrey, Org. Syn. Coll. Vol. III, 535 (1955).

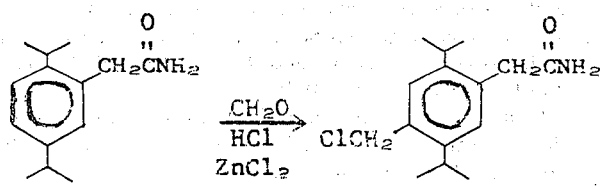

The substituted benzeneacetamides are prepared using reactions generally known in the art. For instance, the dialkylbenzeneacetamides are prepared by chloromethylating the dialkylbenzene, displacing the benzylic chlorine with a cyano group and then hydrolyzing the benzeneacetonitrile to the benzeneacetamide by the method of Wenner, J. Org. Chem., 15, 548 (1950).

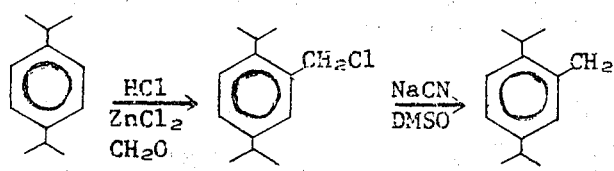

DMSO = dimethyl sulfoxide

An alternate procedure for the preparation of compounds of formula (1)($n = 1$) is shown below:

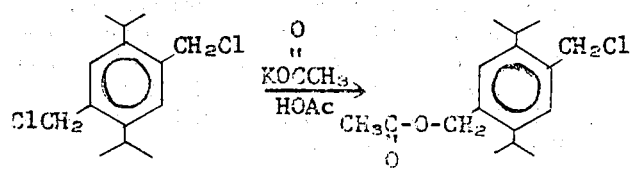

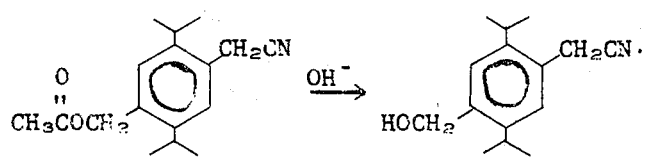

$X$ = halogen

The halomethylbenzeneacetonitriles may be halogenated to a mono or dihalo compound, e.g.

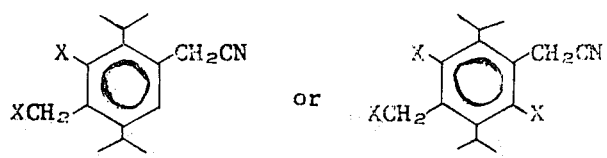

Halogenation is carried out by well-known methods, iron powder being a suitable catalyst. A good operation procedure is described by Fuson and Corse, J. Am. Chem. Soc. 60, 2063 (1938).

The compounds of this invention are useful as selective pre-plant incorporated, preemergence, or postemergence herbicides. They provide control of many weeds with excellent selectivity in such crops as corn, soybeans, wheat, cotton and rice. The compounds are most advantageously applied preemergence, at rates of 0.25 to 10 pounds per acre, depending on the crop, the weed to be controlled, the soil and environmental conditions and the particular chemical used. Under certain conditions such as lack of rainfall for an extended period after application it is advantageous to soil incorpo-

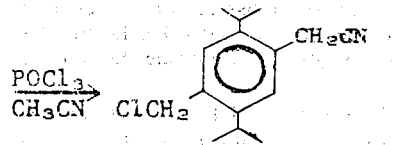

rate these compounds. Selected members of this class of compounds have postemergence activity and may be used at rates of 1 to 10 kg./ha. for postemergence weed control, if applied while susceptible weeds are young, preferably in the two-leaf stage of development. Two or more benzeneacetonitriles of the invention can be used simultaneously, if desired.

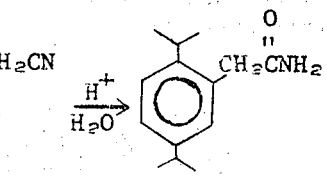

Weeds controlled include crabgrass (*Digitaria* spp.), barnyardgrass (*Echinochloa crusgalli*), junglerice (*Echinochloa colonum*), foxtail (*Setaria* spp.), witch-

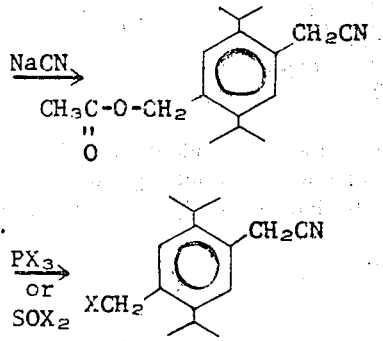

grass (*Panicum capillare*), goosegrass (*Eleusine indica*), pigweed (*Amaranthus retroflexus*), wild mustard (*Brassica* spp.), curly dock (*Rumex crispus*), johnsongrass (*Sorghum halepense*) from seed, cheat (*Bromus secalinus*), downy brome (*Bromus tectorum*) and blackgrass (*Alopucurus mysuroides*).

It is sometimes advantageous to combine a compound of this invention with another herbicide in order to increase the spectrum of weeds controlled and to minimize the chances of injury to the current or subsequent crops. The exact combination which may be used to the best advantage will depend upon the crop, the weeds to be controlled and the environment in which the crop is growing. The combination which will be most advantageous depends on the crop, the soil, the weeds expected and the climate, but can be readily selected by one with ordinary skill in the art. The use of other herbicides in combination with the herbicides of this invention will provide control of a wide variety of broadleaved weeds including ragweed (Ambrosia spp.) lambsquarter (*Chenopodium album*), morningglory (Ipomea spp.) sicklepod (*Cassia obtusifolia*), smartweed (Polyganum spp.), flower-of-an-hour (*Hibiscus*

*trionum*), cocklebur (Xanthium spp.) and velvetleaf (*Abutilon theophrasti*), as well as grasses.

The herbicidal compositions of this invention containing mixtures with other herbicides can be formulated as such. Alternatively, the compounds of Formula (1) may be tank-mixed with other known herbicides or applied sequentially with other known herbicides.

Among the known herbicides which can be combined with the compounds of Formula (1) are:

SUBSTITUTED UREAS 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea
N-cyclooctyl-N'-dimethylurea
3-(4-chlorophenyl)-1-methyl-1-(1-methyl-2-propynyl)urea
3-(4-bromo-3-chlorophenyl)-1-methoxy-1-methylurea
3-[p-(p-chlorophenoxy)phenyl]-1,1-dimethylurea
3-(4-trifluoromethylphenyl)-1,1-dimethylurea
3-(4-bromophenyl)-1-methoxy-1-methylurea
3-(hexahydro-4,7-methanoindan-5-yl)-1,1-dimethylurea
1-(2-methylcyclohexyl)-3-phenylurea
3-(p-cumenyl)-1,1-dimethylurea These ureas can be mixed with the compounds of Formula (1) in weight proportions of from 1:40 to 10:1, the preferred ratio being 1:12 to 4:1.

SUBSTITUTED TRIAZINES 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine
2-methoxy-4,6-bis(isopropylamino)-s-triazine
2-ethylamino-4-isopropylamino-6-methylmercapto-s-triazine
2-chloro-4-chloropropylamino-6-isopropylamino-1,3,5-triazine
2,4-bis(isopropylamino)-6-methylmercapto-s-triazine
2-tert-butylamino-4-ethylamino-6-methylthio-s-triazine These triazines can be mixed with the compounds of this invention in the weight proportions of from 1:40 to 10:1, the preferred ratio being 1:12 to 4:1.

PHENOLS 3,5-dinitro-o-cresol
4,6-dinitro-o-sec-butylphenol and its salts
4,6-dinitro-o-sec-amylphenol
pentachlorophenol and its salts These phenols can be mixed with the compounds of this invention in the weight proportions of from 1:10 to 10:1, the preferred ratio being 1:5 to 5:1.

SUBSTITUTED URACILS 3-isopropyl-5-bromo-6-methyluracil
5-bromo-3-sec-butyl-6-methyluracil
3-tert-butyl-5-chloro-6-methyluracil
5-chloro-6-methyl-3-neopentyluracil
3-tert-butyl-5-bromo-6-methyluracil
3-isopropyl-5-chloro-6-methyluracil
3-tert-butyl-5-chloro-6-ethyluracil
3-tert-butyl-5-chloro-6-chloromethyluracil
3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil
3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil
3-cyclohexyl-5-bromouracil
3-cyclohexyl-5-chlorouracil
3-isopropyl-5-bromouracil
3-sec-butyl-5-bromouracil
3-sec-butyl-5-chlorouracil
3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil These substituted uracils can be mixed with the compounds of this invention in the weight proportions of from 1:80 to 10:1, the preferred ratio being from 1:20 to 4:1.

CARBOXYLIC ACIDS AND DERIVATIVES

The following carboxylic acids and derivatives can be mixed with the compounds of this invention in the listed weight proportions:

A.
2,3,6-trichlorobenzoic acid and its salts
2,3,5,6-tetrachlorobenzoic acid and its salts 2-methoxy-3,5,6-trichlorobenzoic acid and its salts
2-methoxy-3,6-dichlorobenzoic acid and its salts
2-methoxy-3,5,6-trichlorobenzoic acid
3-amino-2,5-dichlorobenzoic acid and its salts
3-nitro-2,5-dichlorobenzoic acid and its salts
2-methyl-3,6-dichlorobenzoic acid and its salts
4-chlorophenoxyacetic acid and its salts and esters
2,4-dichlorophenoxyacetic acid and its salts and esters
2,4-dichlorophenoxyethylsulfate
2,4,5-trichlorophenoxyacetic acid and its salts and esters (2-methyl-4-chlorophenoxy)acetic acid and its salts and esters
(2-methyl-4-chlorophenoxy)propionic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol
tris(2,4-dichlorophenoxyethyl)phosphite
Mixed in a 1:80 to 8:1 ratio, preferably a 1:20 to 2:1 ratio.

B.
2,6-dichlorobenzonitrile
3,5-dibromo-4-hydroxybenzonitrile
Mixed in a 1:40 to 4:1 ratio, preferably a 1:16 to 3:1 ratio.

C.
trichloroacetic acid and its salts
Mixed in a 1:8 to 8:1 ratio, preferably a 1:4 to 4:1 ratio.

D.
2,2-dichloropropionic acid and its salts
2-(α-naphthoxy)-N,N-diethylpropionamide
2-(4-chloro-6-ethylamino-2-ylamino)methylpropionitrile
Mixed in a 1:8 to 8:1 ratio, preferably a 1:4 to 4:1 ratio.

E.
N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester
S-2,3-dichloroallyl-N,N-diisopropylthiolcarbamate
S-2,3,3-trichloroallyl-N,N-di-isopropylthiolcarbamate
S-propyl-n-butylethylthiocarbamic acid
2-chloroallyldithiocarbamate
S-ethyl diisobutylthiocarbamate
2-chloroallyldiethyldithiocarbamate
S-ethyl-N-ethylthiocyclohexanecarbamate
Mixed in a 1:4 to 4:1 ratio, preferably a 1:2 to 2:1 ratio.

F.
N-phenylcarbamic acid, isopropyl ester
N-(m-chlorophenyl)carbamic acid, isopropyl ester
N-(m-chlorophenyl)carbamic acid, 4-chloro-2-butynyl ester
N-(3,4-dichlorophenyl)carbamic acid, methyl ester
N-(3,3-dimethylureido)phenyl-tert-butylcarbamate
2,6-di-tert-butyl-p-tolylmethylcarbamate
Mixed in a 1:8 to 8:1 ratio, preferably a 1:4 to 4:1 ratio.

G.
2,3,6-trichlorophenylacetic acid and its salts
Mixed in a 1:4 to 8:1 ratio, preferably a 1:4 to 4:1 ratio.

H.
2-chloro-N,N-diallylacetamide maleic hydrazide
1,2-dihydropyridazine-3,6-dione
3',4'-dichloro-2-methacrylanilide
2-chloro-2',6'-diethyl-N-(methoxymethyl)acetanilide
N-(butoxymethyl)-2-chloro-2',6'-diethylacetanilide
3,5-dinitro-N',N'-dipropylsulfanilamide
2-chloro-N-isopropylacetanilide
3',4'-dichloropropionanilide
Mixed in a 1:8 to 10:1 ratio, preferably a 1:4 to 5:1 ratio.

I.
4-amino-3,5,6-trichloropicolinic acid
Mixed in a 1:100 to 4:1 ratio, preferably a 1:20 to 2:1 ratio.

INORGANIC AND MIXED INORGANIC-ORGANIC SALTS

The following salts can be mixed with the compounds of this invention in the listed weight proportions:

A.
monoammonium methanearsonate
calcium methylarsonate
calcium propylarsonate
disodium monomethylarsonate
octyl-dodecylammoniummethylarsonate
dimethylarsinic acid
hydroxydimethylarsine oxide
Mixed in a 1:8 to 4:1 ratio, preferably a 1:4 to 2:1 ratio.

B.
sodium arsenite
potassium cyanate
Mixed in a 1:10 to 20:1 ratio, preferably a 1:5 to 10:1 ratio.

C.
lead arsenate
calcium arsenate
Mixed in a 10:1 to 100:1 ratio, preferably a 20:1 to 50:1 ratio.

D.
sodium tetraborate hydrated, granulated
sodium metaborate
sodium pentaborate
polyborchlorate
unrefined borate ore such as borascu
Mixed in a 10:1 to 600:1 ratio, preferably a 20:1 to 400:1 ratio.

E.
ammonium thiocyanate
Mixed in a 1:10 to 10:1 ratio, preferably a 1:5 to 5:1 ratio.

F.
sodium chlorate
Mixed in a 10:1 to 200:1 ratio, preferably a 15:1 to 100:1 ratio.

G.
ammonium sulfamate
Mixed in a 1:1 to 200:1 ratio, preferably a 2:1 to 100:1 ratio.

OTHER ORGANIC HERBICIDES

These organic herbicides can be mixed with compounds of this invention in the listed weight proportions:

A.
6,7-dihydrodipyrido[1,2-a;2',1'-c]pyrazinediium ion
1,1'-dimethyl-4,4'-bipyridinium ion
Mixed in a 1:20 to 10:1 ratio, preferably a 1:10 to 5:1 ratio.

B.
3-amino-1,2,4-triazole

Mixed in a 1:20 to 20:1 ratio, preferably a 1:10 to 10:1 ratio.

C.
3,6-endoxohexahydrophthalic acid

Mixed in a 1:10 to 20:1 ratio, preferably a 1:4 to 10:1 ratio.

D.
hexachloroacetone

Mixed in a 1:8 to 16:1 ratio, preferably a 1:4 to 8:1 ratio.

E.
diphenylacetonitrile
N,N-dimethyl-α,α-diphenylacetamide
N,N-di-n-propyl-2,6-dinitro-4-trifluoromethylaniline
N,N-di-n-propyl-2,6-dinitro-4-methylaniline
2,6-dinitro-N,N-di(2-chloroethyl)-p-toluidine
4-(methylsulfonyl)-2,6-dinitro-N,N-dipropylaniline
N-sec-butyl-4-tert-butyl-2,6-dinitroaniline
4-isopropyl-2,6-dinitro-N,N-dipropylaniline Mixed in a 1:10 to 10:1 ratio, preferably a 1:5 to 5:1 ratio.

F.
O-(2,4-dichlorophenyl)-O-methylisopropylphosphoramidothiate
O,O-diisopropylphosphorodithioate-S-ester with N-(2-mercaptoethyl)benzenesulfonamide
S-ethylhexahydro-1-H-azepine-1-carbothioate
2,3,5,6-tetrachloroterephthalic acid, dimethyl ester Mixed in a 1:20 to 20:1 ratio, preferably a 1:10 to 10:1 ratio.

G.
2,4-dichlorophenyl-4'-nitrodiphenyl ether
2,4-dinitro-4-trifluoromethyldiphenylether Mixed in a 1:20 to 10:1 ratio, preferably a 1:10 to 5:1 ratio.

H.
N-1-naphthylphthalamic acid and its salts

Mixed in a 1:8 to 20:1 ratio, preferably a 1:4 to 10:1 ratio.

I.
3'-chloro-2-methyl-p-valerotoluidide
2-chloro-N-(ethoxymethyl)-6'-ethyl-O-acetotoluidide
N-butyl-N-ethyl-α,α,α-trifluoro-2,6-dinitro-p-toluidine Mixed in a 1:10 to 10:1 ratio, preferably a 1:5 to 5:1 ratio.

J.
3,3a-dihydro-2-(p-methoxyphenyl)-8H-pyrazolo(5,1A)-isoindol-8-one
2-[3-(4-methoxyphenyl)-5pyrazolyl]benzoic acid
2-(3-phenyl-5-pyrazolyl)benzoic acid Mixed in a 1:20 to 8:1 ratio, preferably a 1:10 to 4:1 ratio.

The preparation of representative benzeneacetonitriles of the present invention is illustrated in the following examples, in which all parts, proportions, and percentages are by weight, unless indicated otherwise.

EXAMPLE 1

2-Bromo-1,4-diisopropylbenzene

To a 1-liter flask containing 243 parts of p-diisopropylbenzene, 300 parts of carbon tetrachloride and 2.5 parts of iron powder is added dropwise 240 parts of bromine and sufficient carbon tetrachloride to make 180 parts of solution during 7 hours at a temperature of −5°C. The solution is decanted from the residual ferric bromide and washed twice with 3N HCl. The carbon tetrachloride is removed under reduced pressure. A solution of 40 parts potassium hydroxide in 200 parts of ethyl alcohol is added and refluxed 0.5 hr. The solution is poured into water, separated, washed with dilute hydrochloric acid, dilute sodium bisulfite solution and water, and dried. The solvent is removed and the 2-bromo-1,4-diisopropylbenzene distilled, bp 142°C at 25 mm, $n_D^{25}$ 1.5292.

By substituting the following alkylbenzenes for p-diisopropylbenzene, the following haloalkylbenzenes are made:

TABLE I

| Starting Material | Product |
| --- | --- |
| p-isobutylisopropylbenzene | 3-bromo-4-isobutylisopropylbenzene |
| m-isobutylisopropylbenzene | 4-bromo-3-isobutylisopropylbenzene |
| p-isobutylpropylbenzene | 2-bromo-4-isobutylpropylbenzene |
| p-sec-butylisobutylbenzene | 2-bromo-4-sec-butylisobutylbenzene |
| m-sec-butylisobutylbenzene | 1-bromo-4-sec-butyl-2-isobutylbenzene |
| p-ethylisobutylbenzene | 2-bromo-1-ethyl-4-isobutylbenzene |
| p-di-sec-butylbenzene | 2-bromo-1,4-di-sec-butylbenzene |
| m-di-sec-butylbenzene | 1-bromo-2,4-di-sec-butylbenzene |
| p-tert-butylisopropylbenzene | 2-bromo-4-butylisopropylbenzene |
| m-tert-butylisobutylbenzene | 1-bromo-4-tert-butyl-2-isobutylbenzene |
| m-diisopropylbenzene | 4-bromo-1,3-diisopropylbenzene |
| p-diisobutylbenzene | 2-bromo-1,4-diisobutylbenzene, bp 72°C at 0.1 mm |
| di-tert-butylbenzene | 1,4-di-tert-butyl-2-chlorobenzene |
| p-tert-butylethylbenzene | 2-bromo-4-tert-butylethylbenzene |
| p-sec-butylethylbenzene | 2-bromo-4-sec-butylethylbenzene |
| p-(1,2-dimethylpropyl)ethylbenzene | 2-bromo-4-(1,2-dimethylpropyl)ethylbenzene |
| p-(1,2-dimethylpropyl)propylbenzene | 2-bromo-4-(1,2-dimethylpropyl)propylbenzene |
| p-(1,2-dimethylpropyl)isobutylbenzene | 2-bromo-4-(1,2-dimethylpropyl)isobutylbenzene |
| p-tert-butylisobutylbenzene | 2-bromo-4-tert-butylisobutylbenzene |
| p-ethyl-tert-pentylbenzene | 2-bromo-1-ethyl-4-tert-pentylbenzene |
| 2-fluoro-1,4-diisobutylbenzene | 5-bromo-2-fluoro-1,4-diisobutylbenzene |
| 2-fluoro-1,5-diisopropylbenzene | 4-bromo-2-fluoro-1,5-diisopropylbenzene |
| 4-(1,2-dimethylpropyl)-1-ethyl-2-fluorobenzene | 5-bromo-4-(1,2-dimethylpropyl)-1-ethyl-2-fluorobenzene |
| m-ethyl-tert-pentylbenzene | 4-bromo-3-ethyl-tert-pentylbenzene |
| p-methyl-(1,1,2,2-tetramethylpropyl)benzene | 2-bromo-1-methyl-4-(1,1,2,2-tetramethylpropyl)benzene |
| p-ethyl-(1,1,2,2-tetramethylpropyl)benzene | 2-bromo-1-ethyl-4-(1,1,2,2-tetramethylpropyl)benzene |
| m-diethylbenzene | 2-bromo-1,3-diethylbenzene |
| m-diisobutylbenzene | 2-bromo-1,3-diisobutylbenzene |
| p-ethylneopentylbenzene | 3-bromo-4-ethylneopentylbenzene |

EXAMPLE 2

2-Fluoro-1,4-diisobutylbenzene — (Org. React. Vol V, p 203)

To 124 parts of 6N hydrochloric acid is added 48.8 parts of 2,5-diisobutylaniline. The mixture is cooled to 0° and a cold solution of 17.3 parts of sodium nitrite in water is added slowly, keeping temperature at 0°. A cold solution of 35 parts of ammonium fluoroborate in 120 parts of water is added with vigorous stirring. After one half hour, the precipitate is collected, washed with 25 parts cold 5% ammonium fluoroborate solution, 30 parts cold methanol, and ether. The 2,5-diisobutylbenzenediazonium fluoroborate is air dried. The salt is placed in a flask with tube connecting to a second cooled flask and heated until decomposition begins. Sufficient heat to maintain gentle decomposition is continued. When decomposition is complete, the 2-fluoro-1,4-diisobutylbenzene is taken up in ether, washed with dilute sodium hydroxide and water, and dried. Removal of the ether gives 2-fluoro-1,4-diisobutylbenzene which can be purified by distillation under reduced pressure.

In a similar manner the following compounds are prepared:

EXAMPLE 3

4-Bromo-2,5-diisopropylbenzyl Chloride

In a flask is placed 36 parts of 2-bromo-1,4-diisopropylbenzene, 30 parts of paraformaldehyde and 20 parts of zinc chloride. A stream of dry hydrogen chloride is passed in with stirring, and the temperature rises to 65°C. The temperature is maintained at 65°C for 3 hours and is increased to 70°C. Additional amounts of 15 parts of paraformaldehyde and 15 parts of zinc chloride are added, and the reaction is continued at 75° for a total time of 6.5 hrs. The mixture is cooled and washed with hydrochloric acid, dilute sodium bicarbonate, and water. After drying, the 4-bromo-2,5-diisopropylbenzyl chloride is distilled, bp 91°–93°C at 0.5 mm.

By substituting the following haloalkylbenzenes for 2-bromo-1,4-diisopropylbenzene, the following haloalkylbenzyl halides are made.

TABLE III

| Starting Material | Product |
| --- | --- |
| 3-bromo-4-isobutylisopropylbenzene | 4-bromo-5-isobutyl-2-isopropylbenzyl chloride |
| 3-bromo-4-isobutylisopropylbenzene | 3-bromo-2-isobutyl-5-isopropylbenzyl chloride |
| 2-bromo-4-isobutylpropylbenzene | 4-bromo-2-isobutyl-5-propylbenzyl chloride |
| 2-bromo-4-sec-butylisobutylbenzene | 4-bromo-2-sec-butyl-5-isobutylbenzyl chloride |
| 1-bromo-4-sec-butyl-2-isobutylbenzene | 5-bromo-2-sec-butyl-4-isobutylbenzyl chloride |
| 2-bromo-1-ethyl-4-isobutylbenzene | 4-bromo-5-ethyl-2-isobutylbenzyl chloride |
| 2-bromo-1,4-di-sec-butylbenzene | 4-bromo-2,5-di-sec-butylbenzyl chloride |
| 1-bromo-2,4-di-sec-butylbenzene | 5-bromo-2,4-di-sec-butylbenzyl chloride |
| 2-bromo-4-tert-butylisopropylbenzene | 4-bromo-2-tert-butyl-5-isopropylbenzyl chloride |
| 4-tert-butyl-2-chloroisopropylbenzene | 2-tert-butyl-4-chloro-5-isopropylbenzyl bromide |
| 4-bromo-1,3-diisopropylbenzene | 5-bromo-2,4-diisopropylbenzyl chloride |
| 2-bromo-1,4-diisobutylbenzene | 4-bromo-2,5-diisobutylbenzyl chloride, bp 107–110°C at 0.1 mm |
| 5-bromo-2-fluoro-1,4-diisobutylbenzene | 5-bromo-2-fluoro-3,6-diisobutylbenzyl chloride |
| 4-bromo-2-fluoro-1,5-diisopropylbenzene | 5-bromo-3-fluoro-2,6-diisopropylbenzyl chloride |
| 5-bromo-4-(1,2-dimethylpropyl)-1-ethyl-2-fluorobenzene | 5-bromo-6-(1,2-dimethylpropyl)-3-ethyl-2-fluorobenzyl chloride |
| 4-bromo-3-ethyl-tert-pentylbenzene | 5-bromo-4-ethyl-2-tert-pentylbenzyl chloride |

In some cases, chloromethylation of the bromoalkylbenzenes gives mixtures of isomers. These may be separated by careful distillation or by chromatography, but usually the mixture is used in subsequent reaction. The following compounds give the indicated mixtures when chloromethylated:

TABLE II

| Starting Material | Product |
| --- | --- |
| 2,4-diisopropylaniline | 4-fluoro-1,3-diisopropylbenzene |
| 5-(1,2-dimethylpropyl)-2-ethylaniline | 4-(1,2-dimethylpropyl)-1-ethyl-2-fluorobenzene |
| 2-ethyl-5-(1,1,2,2-tetramethyl)aniline | 1-ethyl-2-fluoro-4-(1,1,2,2-tetramethyl)benzene |
| 2,5-diisopropylaniline | 2-fluoro-1,4-diisopropylbenzene |
| 2-isobutyl-5-isopropylaniline | 2-fluoro-1-isobutyl-4-isopropylbenzene |
| 5-tert-butyl-2-isopropylaniline | 4-tert-butyl-2-fluoro-1-isopropylbenzene |

TABLE IV

| Starting Material | Product |
| --- | --- |
| 2-bromo-1,4-di-tert-butylbenzene | 3-bromo-2,5-di-tert-butylbenzyl chloride |
| | 4-bromo-2,5-di-tert-butylbenzyl chloride |
| 2-bromo-4-tert-butylethylbenzene | 3-bromo-5-tert-butyl-2-ethylbenzyl chloride |
| | 4-bromo-2-tert-butyl-5-ethylbenzyl chloride, bp 92°C/0.05 mm |
| 2-bromo-4-sec-butylethylbenzene | 3-bromo-5-sec-butyl-2-ethylbenzyl chloride |
| | 4-bromo-2-sec-butyl-5-ethylbenzyl chloride |
| 2-bromo-4-(1,2-dimethylpropyl)ethylbenzene | 3-bromo-5-(1,2-dimethylpropyl)-2-ethylbenzyl chloride |
| | 4-bromo-2-(1,2-dimethylpropyl)-5-ethylbenzyl chloride |
| 2-bromo-4-(1,2-dimethylpropyl)propylbenzene | 3-bromo-5-(1,2-dimethylpropyl)-2-propylbenzyl chloride |
| | 4-bromo-2-(1,2-dimethylpropyl)-5-propylbenzyl chloride |

Table IV—Continued

| Starting Material | Product |
|---|---|
| 2-bromo-4-(1,2-dimethylpropyl)isobutylbenzene | 3-bromo-5-(1,2-dimethylpropyl)-2-isobutylbenzyl chloride |
| | 4-bromo-2-(1,2-dimethylpropyl)-5-isobutylbenzyl chloride |
| 2-bromo-4-tert-butylisobutylbenzene | 3-bromo-5-tert-butyl-2-isobutylbenzyl chloride |
| | 4-bromo-2-tert-butyl-5-isobutylbenzyl chloride |
| 2-bromo-1-ethyl-4-tert-pentylbenzene | 3-bromo-2-ethyl-5-tert-pentylbenzyl chloride |
| | 4-bromo-5-ethyl-2-tert-pentylbenzyl chloride |
| 2-bromo-1-ethyl-4-(1-ethyl-1-methylpropyl)benzene | 3-bromo-2-ethyl-5-(1-ethyl-1-methylpropyl)benzyl chloride |
| | 4-bromo-5-ethyl-2-(1-ethyl-1-methylpropyl)benzyl chloride |
| 3-bromo-4-ethylneopentylbenzene | 3-bromo-2-ethyl-5-neopentylbenzyl chloride |
| | 4-bromo-5-ethyl-2-neopentylbenzyl chloride |
| 2-bromo-1,3-diethylbenzene | 3-bromo-2,4-diethylbenzyl chloride |
| | 4-bromo-3,5-diethylbenzyl chloride |
| 2-bromo-1,3-diisobutylbenzene | 3-bromo-2,4-diisobutylbenzyl chloride |
| | 4-bromo-3,5-diisobutylbenzyl chloride |

TABLE VI

| Starting Material | Product |
|---|---|
| 4-bromo-2-ethyl-5-isobutylbenzyl chloride | 4-bromo-2-chloro-6-ethyl-3-isobutylbenzyl chloride |
| 4-bromo-5-(1,2-dimethylpropyl)-2-propylbenzyl chloride | 4-bromo-2-chloro-3-(1,2-dimethylpropyl)-6-propylbenzyl chloride |
| 3-iodo-2,6-diisopropyl-4-methylbenzyl chloride | 3,5-diiodo-2,6-diisopropyl-4-methylbenzyl chloride |
| 4-bromo-2-isopropyl-5-(1,1,2,2-tetramethylpropyl)benzyl chloride | 4-bromo-2-chloro-6-isopropyl-3-(1,1,2,2-tetramethylpropyl)benzyl chloride |
| 4-bromo-5-isobutyl-2-isopropylbenzyl chloride | 4-bromo-2-chloro-3-isobutyl-6-isopropylbenzyl chloride |
| 3-bromo-2,6-di-tert-butyl-4-methylbenzyl chloride | 3-bromo-2,6-di-tert-butyl-5-chloro-4-methylbenzyl chloride |

EXAMPLE 4

2,4-Dibromo-3,6-diisobutylbenzyl Chloride

To a solution of 23.8 parts of 2,5-diisobutylbenzyl chloride in 50 parts of carbon tetrachloride there is added 1.0 part of iron powder. The mixture is cooled to 0°, and a solution of 32 parts of bromine in 30 parts of carbon tetrachloride is added dropwise during 7 hours at 0°. The resulting solution is washed with dilute hydrochloric acid, dilute sodium bicarbonate solution, dilute sodium bisulfite solution, and water. After drying with magnesium sulfate, the carbon tetrachloride is removed and 2,4-dibromo-3,6-diisobutylbenzene is recovered.

By replacing 2,5-diisobutylbenzyl chloride with the following benzyl chlorides, the following products are obtained:

TABLE V

| Starting Material | Product |
|---|---|
| 2,5-dipropylbenzyl chloride | 2,4-dibromo-3,6-dipropylbenzyl chloride |
| 2-isobutyl-5-isopropylbenzyl chloride | 2,4-dibromo-6-isobutyl-3-isopropylbenzyl chloride |
| 2,5-diisopropylbenzyl chloride | 2,4-dibromo-3,6-diisopropylbenzyl chloride |
| 2,5-di-tert-butylbenzyl chloride | 2,4-dibromo-3,6-di-tert-butylbenzyl chloride |
| 2,5-di-sec-butylbenzyl chloride | 2,4-dibromo-3,6-di-sec-butylbenzyl chloride |

EXAMPLE 5

4-Bromo-2-chloro-3,6-diisopropylbenzyl Chloride

To a solution of 29 parts of 4-bromo-2,5-diisopropylbenzyl chloride in 50 parts of carbon tetrachloride there is added 1.0 part of iron powder. To the mixture, cooled to 0° and stirred, there is added 7.8 parts of chlorine during 2 hr. Stirring is continued for 2 hours; the solution is washed with dilute hydrochloric acid, sodium bicarbonate solution, and water. After drying, the carbon tetrachloride is removed, and 4-bromo-2-chloro-3,6-diisopropylbenzyl chloride is recovered.

By replacing 4-bromo-2,5-diisopropylbenzyl chloride with the following benzyl chlorides, these products are obtained:

For unsymmetrical alkylbenzenes, a different ultimate product is obtained if one first chloromethylates and then brominates.

EXAMPLE 6

2-Isobutyl-5-isopropylbenzyl Chloride

In a flask there are placed 176 parts of p-isopropylisobutylbenzene, 15 parts of paraformaldehyde, and 15 parts of zinc chloride. A stream of hydrogen chloride is passed into the mixture, and the temperature is increased to 65°C. After the mixture is saturated with hydrogen chloride, stirring is continued at 70°–75°C for 3 hours. The mixture is cooled and washed with hydrochloric acid, sodium bicarbonate solution, and water. After drying, the product is distilled. The first fraction is the unchanged starting material; the higher boiling material, 75°–80°C at 0.05 mm, is the desired 2-isobutyl-5-isopropylbenzyl chloride.

By the use of the indicated starting alkylbenzene in the same molar amount as in the above example, the following compounds are prepared:

TABLE VII

| Starting Material | Product |
| --- | --- |
| m-isobutylisopropylbenzene | 2-isobutyl-4-isopropylbenzyl chloride |
| p-isobutylpropylbenzene | 5-isobutyl-2-propylbenzyl chloride |
| m-isobutylpropylbenzene | 4-isobutyl-2-propylbenzyl chloride |
| p-sec-butylisobutylbenzene | 5-sec-butyl-2-isobutylbenzyl chloride |
| m-sec-butylisobutylbenzene | 4-sec-butyl-2-isobutylbenzyl chloride |
| p-ethylisobutylbenzene | 2-ethyl-5-isobutylbenzyl chloride |
| m-tert-butylcumene | 4-tert-butyl-2-isopropylbenzyl chloride |
| p-tert-butylethylbenzene | 5-tert-butyl-2-ethylbenzyl chloride |
| p-sec-butylethylbenzene | 5-sec-butyl-2-ethylbenzyl chloride |
| p-(1,2-dimethylpropyl)ethylbenzene | 5-(1,2-dimethylpropyl)-2-ethylbenzyl chloride |
| p-(1,2-dimethylpropyl)propylbenzene | 5-(1,2-dimethylpropyl)-2-propylbenzyl chloride |
| p-(1,2-dimethylpropyl)isobutylbenzene | 5-(1,2-dimethylpropyl)-2-isobutylbenzyl chloride |
| p-tert-butylisobutylbenzene | 5-tert-butyl-2-isobutylbenzyl chloride |
| p-ethyl-tert-pentylbenzene | 2-ethyl-5-tert-pentylbenzyl chloride |
| m-diethylbenzene | 2,4-diethylbenzyl chloride |
| m-diisobutylbenzene | 2,4-diisobutylbenzyl chloride |
| m-dipropylbenzene | 2,6-dipropylbenzyl chloride |
| m-diisobutylbenzene | 2,6-diisobutylbenzyl chloride |
| p-ethyl-1,1,2-trimethylpropyl)benzene | 2-ethyl-5-(1,1,2-trimethylpropyl)benzyl chloride |
| p-propyl-1,1,2,2-tetramethylpropyl)benzene | 2-propyl-5-(1,1,2,2-tetramethylpropyl)benzyl chloride |

EXAMPLE 7

4-Bromo-2-isobutyl-5-isopropylbenzyl Chloride

In a flask are placed 225 parts of 2-isobutyl-5-isopropylbenzyl chloride, 300 parts of carbon tetrachloride and 2.5 parts of iron powder. Bromine (160 parts) in 100 parts of carbon tetrachloride is added dropwise during 7 hr. The solution is washed twice with hydrochloric acid then with sodium bicarbonate solution, dilute sodium bisulfite solution, and water. The solution is dried, the carbon tetrachloride removed and the 4-bromo-2-isobutyl-5-isopropylbenzyl chloride distilled under reduced pressure.

In a similar manner, using the designated benzyl chloride, the following compounds are made:

TABLE VIII

| Starting Material | Product |
| --- | --- |
| 2-isobutyl-4-isopropylbenzyl chloride | 5-bromo-2-isobutyl-4-isopropylbenzyl chloride |
| 5-isobutyl-2-propylbenzyl chloride | 4-bromo-5-isobutyl-2-propylbenzyl chloride |
| 4-isobutyl-2-propylbenzyl chloride | 5-bromo-4-isobutyl-2-propylbenzyl chloride |
| 5-sec-butyl-2-isobutylbenzyl chloride | 4-bromo-5-sec-butyl-2-isobutylbenzyl chloride |
| 4-sec-butyl-2-isobutylbenzyl chloride | 5-bromo-4-sec-butyl-2-isobutylbenzyl chloride |
| 2-ethyl-5-isobutylbenzyl chloride | 4-bromo-2-ethyl-5-isobutylbenzyl chloride |
| 5-tert-butyl-2-isopropylbenzyl chloride | 4-bromo-5-tert-butyl-2-isopropylbenzyl chloride |
| 4-tert-butyl-2-isopropylbenzyl chloride | 6-bromo-4-tert-butyl-2-isopropylbenzyl chloride |
| 2,4-diisopropylbenzyl chloride | 5-chloro-2,4-diisopropylbenzyl chloride |
| 2,4-diisopropylbenzyl chloride | 5-iodo-2,4-diisopropylbenzyl chloride |
| 2-ethyl-5-(1,1,2-trimethylpropyl)benzyl chloride | 4-bromo-2-ethyl-5-(1,1,2-trimethylpropyl)benzyl chloride |
| 2-propyl-5-(1,1,2,2-tetramethylpropyl)benzyl chloride | 4-bromo-2-propyl-5-(1,1,2,2-tetramethylpropyl)-benzyl chloride |

In some cases, bromination of the chloromethylalkylbenzenes gives mixtures of isomers which can be separated by careful distillation or chromatography, but usually the mixture is adequate for the intended purpose. The following compounds give the indicated mixtures when brominated:

TABLE IX

| Starting Material | Product |
| --- | --- |
| 5-tert-butyl-2-ethylbenzyl chloride | 4-bromo-5-tert-butyl-2-ethylbenzyl chloride |
| | 3-bromo-5-tert-butyl-2-ethylbenzyl chloride |
| 5-sec-butyl-2-ethylbenzyl chloride | 4-bromo-4-sec-butyl-2-ethylbenzyl chloride |
| | 3-bromo-5-sec-butyl-2-ethylbenzyl chloride |
| 5-(1,2-dimethylpropyl)-2-ethylbenzyl chloride | 4-bromo-5-(1,2-dimethylpropyl)-2-ethylbenzyl chloride |
| | 3-bromo-5-(1,2-dimethylpropyl)-2-ethylbenzyl chloride |
| 5-(1,2-dimethylpropyl)-2-propylbenzyl chloride | 4-bromo-5-(1,2-dimethylpropyl)-2-propylbenzyl chloride |
| | 3-bromo-5-(1,2-dimethylpropyl)-2-propylbenzyl chloride |
| 5-(1,2-dimethylpropyl)-2-isobutylbenzyl chloride | 4-bromo-5-(1,2-dimethylpropyl)-2-isobutylbenzyl chloride |
| | 3-bromo-5-(1,2-dimethylpropyl)-2-isobutylbenzyl chloride |
| 5-tert-butyl-2-isobutylbenzyl chloride | 4-bromo-5-tert-butyl-2-isobutylbenzyl chloride |
| | 3-bromo-5-tert-butyl-2-isobutylbenzyl chloride |
| 2-ethyl-5-tert-pentylbenzyl chloride | 4-bromo-2-ethyl-5-tert-pentylbenzyl chloride |
| | 3-bromo-2-ethyl-5-tert-pentylbenzyl chloride |
| 2,4-diethylbenzyl chloride | 5-bromo-2,4-diethylbenzyl chloride |
| | 3-bromo-2,4-diethylbenzyl chloride |
| 2,4-diisobutylbenzyl chloride | 5-bromo-2,4-diisobutylbenzyl chloride |
| | 3-bromo-2,4-diisobutylbenzyl chloride |

Table IX—Continued

| Starting Material | Product |
| --- | --- |
| 4-isobutyl-2-propylbenzyl chloride | 5-bromo-4-isobutyl-2-propylbenzyl chloride |
| | 3-bromo-4-isobutyl-2-propylbenzyl chloride |
| 2,6-dipropylbenzyl chloride | 3-bromo-2,6-dipropylbenzyl chloride |
| | 4-bromo-2,6-dipropylbenzyl chloride |
| 2,6-diisobutylbenzyl chloride | 3-bromo-2,6-diisobutylbenzyl chloride |
| | 4-bromo-2,6-diisobutylbenzyl chloride |

EXAMPLE 8

2,6-Dibromo-4-chloromethyl-3,5-diisopropylphenol

Three hundred thirty-six parts of 2,6-dibromo-3,5-diisopropylphenol (prepared as described in Canad, J. Chem., Vol. 41, p. 1653, 1963) is allowed to react with 130 parts of chloromethylmethyl ether and 80 parts of stannic chloride in 400 parts of carbon disulfide under general conditions set forth in "Organic Reactions", Vol. 1, p. 68 and 69. The reaction mixture is poured on ice, and the organic layer is separated and dried over anhydrous sodium sulfate. The solvent is allowed to evaporate and the residue is crystallized to give a pure sample of the title compound. Chloromethylation of the following monohalo- or dihalodialkylphenols gives the corresponding chloromethyl derivatives.

TABLE X

| Starting Materials | Product |
| --- | --- |
| 2,4-dichloro-3,6-diisopropylphenol | 2,4-dichloro-5-chloromethyl-3,6-diisopropylphenol |
| 2,3-dichloro-4,6-diisopropylphenol | 2,3-dichloro-5-chloromethyl-4,6-diisopropylphenol |
| 2,6-dichloro-3,5-diisopropylphenol | 2,6-dichloro-4-chloromethyl-3,5-diisopropylphenol |
| 4,5-dichloro-2,6-diisopropylphenol | 4,5-dichloro-3-chloromethyl-2,6-diisopropylphenol |
| 2-chloro-3,5-diisopropylphenol | 2-chloro-4-chloromethyl-3,5-diisopropylphenol |
| 2-chloro-3,6-diisopropylphenol | 2-chloro-4-chloromethyl-3,6-diisopropylphenol |
| 2-chloro-4,6-diisopropylphenol | 2-chloro-3-chloromethyl-4,6-diisopropylphenol |
| 2-bromo-3,6-diisopropylphenol | 2-bromo-4-chloromethyl-3,6-diisopropylphenol |
| 4-bromo-3,6-diisopropylphenol | 4-bromo-2-chloromethyl-3,6-diisopropylphenol |
| 4-chloro-2,6-diisopropylphenol | 4-chloro-3-chloromethyl-2,6-diisopropylphenol |
| 3-tert-butyl-2,6-dichloro-5-isopropylphenol | 3-tert-butyl-2,6-dichloro-4-chloromethyl-5-isopropylphenol |
| 3-sec-butyl-2,6-dichloro-5-isopropylphenol | 3-sec-butyl-2,6-dichloro-4-chloromethyl-5-isopropylphenol |
| 2,6-dibromo-3-isobutyl-5-isopropylphenol | 2,6-dibromo-3-isobutyl-4-chloromethyl-5-isopropylphenol |
| 3,5-di-sec-butyl-2,6-dichlorophenol | 3,5-di-sec-butyl-2,6-dichloro-4-chloromethylphenol |
| 2,6-dichloro-3,5-diisobutylphenol | 2,6-dichloro-4-chloromethyl-3,5-diisobutylphenol |
| 5-tert-butyl-2,6-dichloro-3-isobutylphenol | 5-tert-butyl-2,6-dichloro-4-chloromethyl-3-isobutylphenol |
| 3,5-di-tert-butyl-2,6-dichlorophenol | 3,5-di-tert-butyl-2,6-dichloro-4-chloromethylphenol |
| 3-tert-butyl-2,6-dichloro-5-ethylphenol | 3-tert-butyl-2,6-dichloro-4-chloromethyl-5-ethylphenol |

EXAMPLE 9

5-Bromo-2-chloromethyl-3,6-diisopropylhydroquinone

Two hundred seventy-three parts of 3-bromo-2,5-diisopropylhydroquinone is allowed to react with 130 parts of chloromethylmethyl ether and 80 parts of stannic chloride in 400 parts of carbon disulfide under general conditions set forth in "Organic Reactions", Vol. 1, p. 68 and 69. The reaction mixture is poured on ice, and the organic layer is separated and dried over anhydrous sodium sulfate. The solvent is allowed to evaporate and the residue is crystallized to give a pure sample of the title compound. Chloromethylation of the following monohalo- or dihalodialkylhydroquinones or resorcinols gives the corresponding chloromethyl derivatives.

TABLE XI

| Starting Material | Product |
| --- | --- |
| 2-bromo-3,5-diisopropylhydroquinone | 2-bromo-6-chloromethyl-3,5-diisopropylhydroquinone |
| 5-bromo-4,6-diisopropylresorcinol | 5-bromo-2-chloromethyl-4,6-diisopropylresorcinol |
| 3-bromo-5-tert-butyl-2-isopropylhydroquinone | 3-bromo-5-tert-butyl-6-dibromomethyl-2-isopropylhydroquinone |
| 3-bromo-5-sec-butyl-2-isopropylhyroquinone | 3-bromo-5-sec-butyl-6-chloromethyl-2-isopropylhydroquinone |
| 3-bromo-2-isobutyl-5-isopropylhydroquinone | 3-bromo-6-chloromethyl-2-isobutyl-5-isopropylhydroquinone |
| 3-bromo-2,5-di-sec-butylhydroquinone | 3-bromo-2,5-di-sec-butyl-6-chloromethylhydroquinone |
| 3-bromo-2,5-diisobutylhydroquinone | 3-bromo-6-chloromethyl-2,5-diisobutylhydroquinone |
| 3-bromo-2,5-di-tert-butylhydroquinone | 3-bromo-2,5-di-tert-butyl-6-chloromethylhydroquinone |
| 3-bromo-5-tert-butyl-2-isobutylhydroquinone | 3-bromo-5-tert-butyl-6-chloromethyl-2-isobutylhydroquinone |
| 3-bromo-5-tert-butyl-2-ethylhydroquinone | 3-bromo-5-tert-butyl-6-chloromethyl-2-ethylhydroquinone |

EXAMPLE 10

1-Bromo-2,6-diisopropylbenzene

A solution of 262 parts of triphenylphosphine in 750 parts of acetonitrile is brominated with 160 parts of bromine at room temperature. The solvent is evaporated and to the residue is added 178 parts of 2,6-diisopropylphenol. The mixture is heated at 200°C as described in J. Am. Chem. Soc. 86, 464 (1964). The product is distilled under reduced pressure and then fractionated at 0.1 mm Hg.

The following compounds are made by appropriate substitution in the above procedure.

TABLE XII

| Starting Material | Product |
|---|---|
| 2,6-diisopropylphenol | 1-chloro-2,6-diisopropylbenzene |
| 2,4-dichloro-5-chloromethyl-3,6-diisopropylphenol | 5-bromo-2,4-dichloro-3,6-diisopropylbenzyl chloride |
| 2,3-dichloro-5-chloromethyl-4,6-diisopropylphenol | 5-bromo-3,4-dichloro-2,6-diisopropylbenzyl chloride |
| 2,6-dichloro-4-chloromethyl-3,5-diisopropylphenol | 4-bromo-3,5-dichloro-2,6-diisopropylbenzyl chloride |
| 4,5-dichloro-3-chloromethyl-2,6-diisopropylphenol | 5-bromo-2,3-dichloro-4,6-diisopropylbenzyl chloride |
| 2-chloro-4-chloromethyl-3,5-diisopropylphenol | 4-bromo-3-chloro-2,6-diisopropylbenzyl chloride |
| 2-chloro-4-chloromethyl-3,6-diisopropylphenol | 4-bromo-3-chloro-3,6-diisopropylbenzyl chloride |
| 2-chloro-3-chloromethyl-4,6-diisopropylphenol | 3-bromo-2-chloro-4,6-diisopropylbenzyl chloride |
| 2-bromo-4-chloromethyl-3,6-diisopropylphenol | 3-bromo-4-chloro-2,5-diisopropylbenzyl chloride |
| 4-bromo-2-chloromethyl-3,6-diisopropylphenol | 5-bromo-2-chloro-3,6-diisopropylbenzyl chloride |
| 4-chloro-3-chloromethyl-2,6-diisopropylphenol | 5-bromo-2-chloro-4,6-diisopropylbenzyl chloride |
| 3-tert-butyl-2,6-dichloro-4-chloromethyl-5-isopropylphenol | 4-bromo-2-tert-butyl-3,5-dichloro-6-isopropylbenzyl chloride |
| 3-sec-butyl-2,6-dichloro-4-chloromethyl-5-isopropylphenol | 4-bromo-2-sec-butyl-3,5-dichloro-6-isopropylbenzyl chloride |
| 2,6-dibromo-3-isobutyl-4-chloromethyl-5-isopropylphenol | 3,4,5-tribromo-2-isobutyl-6-isopropylbenzyl chloride |
| 3,5-di-sec-butyl-2,6-dichloro-4-chloromethylphenol | 4-bromo-2,6-di-sec-butyl-3,5-dichlorobenzyl chloride |
| 2,6-dichloro-4-chloromethyl-3,5-diisobutylphenol | 4-bromo-3,5-dichloro-2,6-diisobutylbenzyl chloride |
| 5-tert-butyl-2,6-dichloro-4-chloromethyl-3-isobutylphenol | 4-bromo-2-tert-butyl-3,5-dichloro-6-isobutylbenzyl chloride |
| 3,5-di-tert-butyl-2,6-dichloro-4-chloromethylphenol | 4-bromo-2,6-di-tert-butyl-3,5-dichlorobenzyl chloride |
| 3-tert-butyl-2,6-dichloro-4-chloromethyl-5-ethyl phenol | 4-bromo-2-tert-butyl-3,5-dichloro-6-ethylbenzyl chloride |

EXAMPLE 11

3-Bromo-2,5-dichloro-4,6-diisopropylbenzyl Chloride

A solution of 404 parts of tri-n-butylphosphine in 1200 parts of acetonitrile is chlorinated with 142 parts of chlorine at room temperature. The solvent is evaporated and to the residue is added 321.5 parts of 2-bromo-6-chloromethyl-3,5-diisopropylhydroquinone. The mixture is heated at 200°C as described in J. Am. Chem. Soc., 86, 464 (1964). The product is distilled under reduced pressure and then fractionated at 0.1 mm Hg.

The following compounds are made by appropriate substitution in the above procedure.

EXAMPLE 12

4-Bromo-2,5-diisopropylbenzeneacetonitrile

In a flask equipped with a mechanical stirrer and reflux condenser is placed 28 parts of finely powdered sodium cyanide and 115 parts of dimethyl sulfoxide. 4-Bromo-2,5-diisopropylbenzyl chloride (145 parts) is added with good stirring, and the temperature is maintained at 60°–65°C by adjusting the addition rate of the benzyl chloride. After complete addition, the mixture is stirred for 0.5 hr at 65°C, cooled, and diluted with 1000 parts of ice water. The reaction mixture is extracted with two portions of methylene chloride. The methylene chloride extracts are combined and dried with anhydrous sodium sulfate. The solvent is removed under reduced pressure and the 4-bromo-2,5-diisopropylbenzeneacetonitrile distilled, bp 146°C at 1 mm.

The following compounds are made by appropriate substitution in the above procedure.

TABLE XIII

| Starting Material | Product |
|---|---|
| 5-bromo-2-chloromethyl-3,6-diisopropyl-hydroquinone | 4-bromo-2,5-dichloro-3,6-diisopropylbenzyl chloride |
| 5-bromo-2-chloromethyl-4,6-diisopropyl-resorcinol | 4-bromo-2,6-dichloro-3,5-diisopropylbenzyl chloride |
| 5-bromo-3-tert-butyl-2-chloromethyl-6-isopropylhydroquinone | 4-bromo-3-tert-butyl-2,5-dichloro-6-isopropyl-benzyl chloride |
| 5-bromo-3-sec-butyl-2-chloromethyl-6-isopropylhydroquinone | 4-bromo-3-sec-butyl-2,5-dichloro-6-isopropyl-benzyl chloride |
| 5-bromo-2-chloromethyl-3-isobutyl-6-isopropylhydroquinone | 4-bromo-2,5-dichloro-3-isobutyl-6-isopropylbenzyl chloride |
| 5-bromo-3,6-di-sec-butyl-2-chloromethyl-hydroquinone | 4-bromo-3,6-di-sec-butyl-2,5-dichlorobenzyl chloride |
| 5-bromo-2-chloromethyl-3,6-diisobutyl-hydroquinone | 4-bromo-2,5-dichloro-3,6-diisobutylbenzyl chloride |
| 5-bromo-3-tert-butyl-2-chloromethyl-6-isobutylhydroquinone | 4-bromo-3-tert-butyl-2,5-dichloro-6-isobutylbenzyl chloride |
| 5-bromo-3-tert-butyl-2-chloromethyl-6-ethylhydroquinone | 4-bromo-3-tert-butyl-2,5-dichloro-6-ethylbenzyl chloride |

TABLE XIV

| Starting Material | Product |
| --- | --- |
| 4-bromo-2,5-di-sec-butylbenzyl chloride | 4-bromo-2,5-di-sec-butylbenzeneacetonitrile |
| 4-bromo-5-isobutyl-2-isopropylbenzyl chloride | 4-bromo-5-isobutyl-2-isopropylbenzeneacetonitrile |
| 5-bromo-4-isobutyl-2-isopropylbenzyl chloride | 5-bromo-4-isobutyl-2-isopropylbenzeneacetonitrile |
| 4-bromo-2-isobutyl-5-propylbenzyl chloride | 4-bromo-2-isobutyl-5-propylbenzeneacetonitrile |
| 4-bromo-2-sec-butyl-5-isobutylbenzyl chloride | 4-bromo-2-sec-butyl-5-isobutylbenzeneacetonitrile |
| 5-bromo-2-sec-butyl-4-isobutylbenzyl chloride | 5-bromo-2-sec-butyl-4-isobutylbenzeneacetonitrile |
| 4-bromo-5-ethyl-2-isobutylbenzyl chloride | 4-bromo-5-ethyl-2-isobutylbenzeneacetonitrile |
| 4-bromo-2,5-di-sec-butylbenzyl chloride | 4-bromo-2,5-di-sec-butylbenzeneacetonitrile |
| 5-bromo-2-tert-butyl-4-isobutylbenzyl chloride | 5-bromo-2-tert-butyl-4-isobutylbenzeneacetonitrile |
| 5-bromo-2,4-diisopropylbenzyl chloride | 5-bromo-2,4-diisopropylbenzeneacetonitrile |
| 4-bromo-2,5-diisobutylbenzyl chloride | 4-bromo-2,5-diisobutylbenzeneacetonitrile |
| 5-bromo-2-isobutyl-4-isopropylbenzyl chloride | 5-bromo-2-isobutyl-4-isopropylbenzeneacetonitrile |
| 4-bromo-5-isobutyl-2-propylbenzyl chloride | 4-bromo-5-isobutyl-2-propylbenzeneacetonitrile |
| 5-bromo-4-isobutyl-2-propylbenzyl chloride | 5-bromo-4-isobutyl-2-propylbenzeneacetonitrile |
| 4-bromo-5-sec-butyl-2-isobutylbenzyl chloride | 4-bromo-5-sec-butyl-2-isobutylbenzeneacetonitrile |
| 5-bromo-4-sec-butyl-2-isobutylbenzyl chloride | 5-bromo-4-sec-butyl-2-isobutylbenzeneacetonitrile |
| 4-bromo-2-ethyl-5-isobutylbenzyl chloride | 4-bromo-2-ethyl-5-isobutylbenzeneacetonitrile |
| 4-bromo-5-tert-butyl-2-isopropylbenzyl chloride | 4-bromo-5-tert-butyl-2-isopropylbenzeneacetonitrile |
| 5-bromo-4-tert-butyl-2-isopropylbenzyl chloride | 5-bromo-4-tert-butyl-2-isopropylbenzeneacetonitrile |
| 5-bromo-2-fluoro-3,6-diisobutylbenzyl chloride | 5-bromo-2-fluoro-3,6-diisobutylbenzeneacetonitrile |
| 5-bromo-3-fluoro-2,6-diisopropylbenzyl chloride | 5-bromo-3-fluoro-2,6-diisopropylbenzeneacetonitrile |
| 5-bromo-6-(1,2-dimethylpropyl)-3-ethyl-2-fluorobenzyl chloride | 5-bromo-6-(1,2-dimethylpropyl)-3-ethyl-2-fluorobenzeneacetonitrile |
| 3-bromo-5-tert-butyl-2-methylbenzyl chloride | 3-bromo-5-tert-butyl-2-methylbenzeneacetonitrile |
| 4-bromo-2-ethyl-5-(1,1,2-trimethylpropyl)benzyl chloride | 4-bromo-2-ethyl-5-(1,1,2-trimethylpropyl)benzeneacetonitrile |
| 4-bromo-2-propyl-5-(1,1,2,2-tetramethylpropyl)-benzyl chloride | 4-bromo-2-propyl-5-(1,1,2,2-tetramethylpropyl)benzeneacetonitrile |
| 5-bromo-4-ethyl-2-tert-pentylbenzyl chloride | 5-bromo-4-ethyl-2-tert-pentylbenzeneacetonitrile |
| 2,4-dibromo-3,6-dipropylbenzyl chloride | 2,4-dibromo-3,6-dipropylbenzeneacetonitrile |
| 2,4-dibromo-6-isobutyl-3-isopropylbenzyl chloride | 2,4-dibromo-3-isopropyl-6-isobutylbenzeneacetonitrile |
| 2,4-dibromo-3,6-diisobutylbenzyl chloride | 2,4-dibromo-3,6-diisobutylbenzeneacetonitrile |
| 4-bromo-2-chloro-6-ethyl-3-isobutylbenzyl chloride | 4-bromo-2-chloro-6-ethyl-3-isobutylbenzeneacetonitrile |
| 4-bromo-2-chloro-3-(1,2-dimethylpropyl)-6-propylbenzyl chloride | 4-bromo-2-chloro-3-(1,2-dimethylpropyl)-6-propylbenzeneacetonitrile |
| 4-bromo-2-chloro-3,6-diisopropylbenzyl chloride | 4-bromo-2-chloro-3,6-diisopropylbenzeneacetonitrile |
| 3-bromo-2,5-dichloro-4,6-diisopropylbenzyl chloride | 3-bromo-2,5-dichloro-4,6-diisopropylbenzeneacetonitrile |
| 5-bromo-2,4-dichloro-3,6-diisopropylbenzyl chloride | 5-bromo-2,4-dichloro-3,6-diisopropylbenzeneacetonitrile |
| 5-bromo-3,4-dichloro-2,6-diisopropylbenzyl chloride | 5-bromo-3,4-dichloro-2,6-diisopropylbenzeneacetonitrile |
| 4-bromo-3,5-dichloro-2,6-diisopropylbenzyl chloride | 4-bromo-3,5-dichloro-2,6-diisopropylbenzeneacetonitrile |
| 4-bromo-2,5-dichloro-3,6-diisopropylbenzyl chloride | 4-bromo-2,5-dichloro-3,6-diisopropylbenzeneacetonitrile |
| 5-bromo-2,3-dichloro-4,6-diisopropylbenzyl chloride | 5-bromo-2,3-dichloro-4,6-diisopropylbenzeneacetonitrile |
| 4-bromo-3-chloro-2,6-diisopropylbenzyl chloride | 4-bromo-3-chloro-2,6-diisopropylbenzeneacetonitrile |
| 4-bromo-3-chloro-2,5-diisopropylbenzyl chloride | 4-bromo-3-chloro-2,5-diisopropylbenzeneacetonitrile |
| 3-bromo-2-chloro-4,6-diisopropylenzyl chloride | 3-bromo-2-chloro-4,6-diisopropylbenzeneacetonitrile |
| 3-bromo-4-chloro-2,5-diisopropylbenzyl chloride | 3-bromo-4-chloro-2,5-diisopropylbenzeneacetonitrile |
| 5-bromo-2-chloro-3,6-diisorpopylbenzyl chloride | 5-bromo-2-chloro-3,6-diisopropylbenzeneacetonitrile |
| 3-bromo-6-chloro-2,4-diisopropylbenzyl chloride | 3-bromo-6-chloro-2,4-diisopropylbenzeneacetonitrile |
| 4-bromo-2-chloro-3,5-diisopropylbenzyl chloride | 4-bromo-2-chloro-3,5-diisopropylbenzeneacetonitrile |
| 4-bromo-2-chloro-3,6-diisopropylbenzyl chloride | 4-bromo-2-chloro-3,6-diisopropylbenzeneacetonitrile |
| 3-bromo-2,4-di-tert-butyl-5-chlorobenzyl chloride | 3-bromo-2,4-di-tert-butyl-5-chlorobenzeneacetonitrile |
| 5-bromo-4-tert-butyl-3-chloro-2-ethylbenzyl chloride | 5-bromo-4-tert-butyl-3-chloro-2-ethylbenzeneacetonitrile |
| 2-sec-butyl-5-bromo-3-chloro-6-ethylbenzyl chloride | 5-bromo-2-sec-butyl-3-chloro-6-ethylbenzeneacetonitrile |
| 3-bromo-4-chloro-2,6-diisobutylbenzyl chloride | 3-bromo-4-chloro-2,6-diisobutylbenzeneacetonitrile |
| 2,5-dibromo-3,6-diisopropylbenzyl chloride | 2,5-dibromo-3,6-diisopropylbenzeneacetonitrile |
| 2,5-dibromo-3,6-di-sec-butylbenzyl chloride | 2,5-dibromo-3,6-di-sec-butylbenzeneacetonitrile |
| 3,6-dibromo-2,4-di-tert-butylbenzyl chloride | 3,6-dibromo-2,4-di-tert-butylbenzeneacetonitrile |
| 4-bromo-2-tert-butyl-3-chloro-5-isopropylbenzyl chloride | 4-bromo-2-tert-butyl-3-chloro-5-isopropylbenzeneacetonitrile |
| 4-bromo-2-sec-butyl-3-chloro-5-isopropylbenzyl chloride | 4-bromo-2-sec-butyl-3-chloro-5-isopropylbenzeneacetonitrile |
| 4-bromo-2-chloro-3,6-diisopropylbenzyl chloride | 4-bromo-2-chloro-3,6-diisopropylbenzeneacetonitrile |
| 3-bromo-2,4-di-tert-butyl-5-chlorobenzyl chloride | 3-bromo-2,4-di-tert-butyl-5-chlorobenzeneacetonitrile |
| 5-bromo-4-tert-butyl-3-chloro-2-ethylbenzyl chloride | 5-bromo-4-tert-butyl-3-chloro-2-ethylbenzeneacetonitrile |
| 2-sec-butyl-5-bromo-3-chloro-6-ethylbenzyl chloride | 5-bromo-2-sec-butyl-3-chloro-6-ethylbenzeneacetonitrile |

TABLE XIV-continued

| Starting Material | Product |
| --- | --- |
| 3-bromo-4-chloro-2,6-diisobutylbenzyl chloride | 3-bromo-4-chloro-2,6-diisobutylbenzeneacetonitrile |
| 2,5-dibromo-3,6-diisopropylbenzyl chloride | 2,5-dibromo-3,6-diisopropylbenzeneacetonitrile |
| 2,5-dibromo-3,6-di-sec-butylbenzyl chloride | 2,5-dibromo-3,6-di-sec-butylbenzeneacetonitrile |
| 3,6-dibromo-2,4-di-tert-butylbenzyl chloride | 3,6-dibromo-2,4-di-tert-butylbenzeneacetonitrile |
| 4-bromo-2-tert-butyl-3-chloro-5-isopropylbenzyl chloride | 4-bromo-2-tert-butyl-3-chloro-5-isopropylbenzeneacetonitrile |
| 4-bromo-2-sec-butyl-3-chloro-5-isopropylbenzyl chloride | 4-bromo-2-sec-butyl-3-chloro-5-isopropylbenzeneacetonitrile |
| 4-bromo-3-chloro-2-isobutyl-5-isopropylbenzyl chloride | 4-bromo-3-chloro-2-isobutyl-5-isopropylbenzeneacetonitrile |
| 3-bromo-2,5-dichloro-4,6-diisopropylbenzyl chloride | 3-bromo-2,5-dichloro-4,6-diisopropylbenzeneacetonitrile |
| 5-bromo-2,4-dichloro-3,6-diisopropylbenzyl chloride | 5-bromo-2,4-dichloro-3,6-diisopropylbenzeneacetonitrile |
| 5-bromo-3,4-dichloro-2,6-diisopropylbenzyl chloride | 5-bromo-3,4-dichloro-2,6-diisopropylbenzeneacetonitrile |
| 4-bromo-3,5-dichloro-2,6-diisopropylbenzyl chloride | 4-bromo-3,5-dichloro-2,6-diisopropylbenzeneacetonitrile |
| 4-bromo-2,5-dichloro-3,6-diisopropylbenzyl chloride | 4-bromo-2,5-dichloro-3,6-diisopropylbenzeneacetonitrile |
| 5-bromo-2,3-dichloro-4,6-diisopropylbenzyl chloride | 5-bromo-2,3-dichloro-4,6-diisopropylbenzeneacetonitrile |
| 4-bromo-3-chloro-2,6-diisopropylbenzyl chloride | 4-bromo-3-chloro-2,6-diisopropylbenzeneacetonitrile |
| 4-bromo-3-chloro-2,5-diisopropylbenzyl chloride | 4-bromo-3-chloro-2,5-diisopropylbenzeneacetonitrile |
| 3-bromo-2-chloro-4,6-diisopropylbenzyl chloride | 3-bromo-2-chloro-4,6-diisopropylbenzeneaceonitrile |
| 3-bromo-4-chloro-2,5-diisopropylbenzyl chloride | 3-bromo-4-chloro-2,5-diisopropylbenzeneacetonitrile |
| 5-bromo-2-chloro-3,6-diisopropylbenzyl chloride | 5-bromo-2-chloro-3,6-diisopropylbenzeneacetonitrile |
| 3-bromo-6-chloro-2,4-diisopropylbenzyl chloride | 3-bromo-6-chloro-2,4-diisopropylbenzeneacetonitrile |
| 4-bromo-2-chloro-3,5-diisopropylbenzyl chloride | 4-bromo-2-chloro-3,5-diisopropylbenzeneacetonitrile |
| 4-bromo-2,5-di-sec-butyl-3-chlorobenzyl chloride | 4-bromo-2,5-di-sec-butyl-3-chlorobenzeneacetonitrile |
| 4-bromo-3-chloro-2,5-diisobutylbenzyl chloride | 4-bromo-3-chloro-2,5-diisobutylbenzeneacetonitrile |
| 4-bromo-2-tert-butyl-3-chloro-5-isobutylbenzyl chloride | 4-bromo-2-tert-butyl-3-chloro-5-isobutylbenzeneacetonitrile |
| 4-bromo-2-tert-butyl-3-chloro-5-ethylbenzyl chloride | 4-bromo-2-tert-butyl-3-chloro-5-ethylbenzeneacetonitrile |

When one treats bromobenzyl chloride mixtures with sodium cyanide in the above manner, mixtures of bromobenzeneacetonitriles are obtained. These can be separated by fractional crystallization or chromatography, but the mixtures themselves are useful in the herbicidal methods and compositions of this invention. The following are examples of conversion to halobenzeneacetonitrile mixtures.

TABLE XV

| Starting Material | Product |
| --- | --- |
| 4-bromo-5-tert-butyl-2-ethylbenzyl chloride and 3-bromo-5-tert-butyl-2-ethylbenzyl chloride | 4-bromo-5-tert-butyl-2-ethylbenzeneacetonitrile and 3-bromo-5-tert-butyl-2-ethylbenzeneacetonitrile |
| 4-bromo-5-sec-butyl-2-ethylbenzyl chloride and 3-bromo-5-sec-butyl-2-ethylbenzyl chloride | 4-bromo-5-sec-butyl-2-ethylbenzeneacetonitrile and 3-bromo-5-sec-butyl-2-ethylbenzeneacetonitrile |
| 4-bromo-5-(1,2-dimethylpropyl)-2-ethylbenzyl chloride and 3-bromo-5-(1,2-dimethylpropyl)-2-ethylbenzyl chloride | 4-bromo-5-(1,2-dimethylpropyl)-2-ethylbenzeneacetonitrile and 3-bromo-5-(1,2-dimethylpropyl)-2-ethylbenzeneacetonitrile |
| 4-bromo-5-(1,2-dimethylpropyl)-2-propylbenzyl chloride and 3-bromo-5-(1,2-dimethylpropyl)-2-propylbenzyl chloride | 4-bromo-5-(1,2-dimethylpropyl)-2-propylbenzeneacetonitrile and 3-bromo-5-(1,2-dimethylpropyl)-2-propylbenzeneacetonitrile |
| 4-bromo-5-(1,2-dimethylpropyl)-2-isobutylbenzyl chloride and 3-bromo-5-(1,2-dimethylpropyl)-2-isobutylbenzyl chloride | 4-bromo-5-(1,2-dimethylpropyl)-2-isobutylbenzeneacetonitrile and 3-bromo-5-(1,2-dimethylpropyl)-2-isobutylbenzeneacetonitrile |
| 4-bromo-5-tert-butyl-2-isobutylbenzyl chloride and 3-bromo-5-tert-butyl-2-isobutylbenzyl chloride | 4-bromo-5-tert-butyl-2-isobutylbenzeneacetonitrile and 3-bromo-5-tert-butyl-2-isobutylbenzeneacetonitrile |
| 4-bromo-2-ethyl-5-tert-pentylbenzyl chloride and 3-bromo-2-ethyl-5-tert-pentylbenzyl chloride | 4-bromo-2-ethyl-5-tert-pentylbenzeneacetonitrile and 3-bromo-2-ethyl-5-tert-pentylbenzeneacetonitrile |
| 3-bromo-2,5-di-tert-butylbenzyl chloride and 4-bromo-2,5-di-tert-butylbenzyl chloride | 3-bromo-2,5-di-tert-butylbenzeneacetonitrile and 4-bromo-2,5-di-tert-butylbenzeneacetonitrile |
| 3-bromo-5-tert-butyl-2-ethylbenzyl chloride and 4-bromo-5-tert-butyl-2-ethylbenzyl chloride | 3-bromo-5-tert-butyl-2-ethylbenzeneacetonitrile and 4-bromo-5-tert-butyl-2-ethylbenzeneacetonitrile |
| 3-bromo-5-sec-butyl-2-ethylbenzyl chloride and 4-bromo-5-sec-butyl-2-ethylbenzyl chloride | 3-bromo-5-sec-butyl-2-ethylbenzeneacetonitrile and 4-bromo-5-sec-butyl-2-ethylbenzeneacetonitrile |
| 3-bromo-5-(1,2-dimethylpropyl)-2-ethylbenzyl chloride and 4-bromo-2-(1,2-dimethylpropyl)-5-ethylbenzyl chloride | 3-bromo-5-(1,2-dimethylpropyl)-2-ethylbenzeneacetonitrile and 4-bromo-2-(1,2-dimethylpropyl)-5-ethylbenzeneacetonitrile |
| 3-bromo-5-(1,2-dimethylpropyl)-2-propylbenzyl chloride and 4-bromo-2-(1,2-dimethylpropyl)-5-propylbenzyl chloride | 3-bromo-5-(1,2-dimethylpropyl)-2-propylbenzeneacetonitrile and 4-bromo-2-(1,2-dimethylpropyl)-5-propylbenzeneacetonitrile |
| 3-bromo-5-(1,2-dimethylpropyl)-2-isobutylbenzyl chloride and 4-bromo-2-(1,2-dimethylpropyl)-5-isobutylbenzyl chloride | 3-bromo-5-(1,2-dimethylpropyl)-2-isobutylbenzeneacetonitrile and 4-bromo-2-(1,2-dimethylpropyl)-5-isobutylbenzeneacetonitrile |

TABLE XV-continued

| | |
|---|---|
| 3-bromo-5-tert-butyl-2-isobutylbenzyl chloride and 4-bromo-2-tert-butyl-5-isobutylbenzyl chloride | 3-bromo-5-tert-butyl-2-isobutylbenzeneacetonitrile and 4-bromo-2-tert-butyl-5-isobutylbenzeneacetonitrile |
| 3-bromo-2-ethyl-5-tert-pentylbenzyl chloride and 4-bromo-5-ethyl-2-tert-pentylbenzyl chloride | 3-bromo-2-ethyl-5-tert-pentylbenzeneacetonitrile and 4-bromo-5-ethyl-2-tert-pentylbenzeneacetonitrile |
| 3-bromo-5-ethyl-5-(1,1,2-trimethylpropyl)benzyl chloride and 4-bromo-5-ethyl-2-(1,1,2-trimethylpropyl)benzyl chloride | 3-bromo-2-ethyl-5-(1,1,2-trimethylpropyl)benzeneacetonitrile and 4-bromo-5-ethyl-2-(1,1,2-trimethylpropyl)benzeneacetonitrile |
| 5-bromo-2,4-diethylbenzyl chloride and 3-bromo-2,4-diethylbenzyl chloride | 5-bromo-2,4-diethylbenzeneacetonitrile and 3-bromo-2,4-diethylbenzeneacetonitrile |
| 5-bromo-2,4-diisobutylbenzyl chloride and 3-bromo-2,4-diisobutylbenzyl chloride | 5-bromo-2,4-diisobutylbenzeneacetonitrile and 3-bromo-2,4-diisobutylbenzeneacetonitrile |
| 5-bromo-4-isobutyl-2-propylbenzyl chloride and 3-bromo-4-isobutyl-2-propylbenzyl chloride | 5-bromo-4-isobutyl-2-propylbenzeneacetonitrile and 3-bromo-4-isobutyl-2-propylbenzeneacetonitrile |
| 3-bromo-2,6-dipropylbenzyl chloride and 4-bromo-2,6-dipropylbenzyl chloride | 3-bromo-2,6-dipropylbenzeneacetonitrile and 4-bromo-2,6-dipropylbenzeneacetonitrile |
| 3-bromo-2,6-diisobutylbenzyl chloride and 4-bromo-2,6-diisobutylbenzyl chloride | 3-bromo-2,6-diisobutylbenzeneacetonitrile and 4-bromo-2,6-diisobutylenzeneacetonitrile |
| 3-bromo-2,4-diethylbenzyl chloride and 4-bromo-3,5-diethylbenzyl chloride | 3-bromo-2,4-diethylbenzeneacetonitrile and 4-bromo-3,5-diethylbenzeneacetonitrile |
| 3-bromo-2,4-diisobutylbenzyl chloride and 4-bromo-3,5-diisobutylbenzyl chloride | 3-bromo-2,4-diisobutylbenzeneacetonitrile and 4-bromo-3,5-diisobutylbenzeneacetonitrile |

EXAMPLE 13

Part A

4-Bromo-2,5-diisopropyl-α-methylbenzeneacetonitrile

A mixture of 4-bromo-2,5-diisopropylbenzeneacetonitrile (22.6 parts), 4.8 parts of a 50% sodium hydride suspension in mineral oil, and 14.2 parts of methyl iodide in 300 parts tetrahydrofuran is stirred and heated at 50° for 2 hours. The reaction mixture is cooled and the tetrahydrofuran stripped under reduced pressure. The solid is washed with pentane and water and dried to give 4-bromo-2,5-diisopropyl-α-methylbenzeneacetonitrile.

Part B

4-Bromo-2,5-diisopropyl-α,α-dimethylbenzeneacetonitrile

When the amounts of sodium hydride and methyl iodide are doubled, and the reaction is carried out the same way, 4-bromo-2,5-diisopropyl-α,α-dimethylbenzeneacetonitrile is obtained.

By the use of Method A, the following compounds are made:

TABLE XVI

| Starting Material | Product |
|---|---|
| 3-bromo-2-isobutyl-5-tert-pentylbenzeneacetonitrile | 3-bromo-2-isobutyl-α-methyl-5-tert-pentylbenzeneacetonitrile |
| 5-bromo-2,4-diisopropyl-3-nitrobenzeneacetonitrile | 5-bromo-2,4-diisopropyl-α-methyl-3-nitrobenzeneacetonitrile |
| 5-bromo-2,4,6-triethylbenzeneacetonitrile | 5-bromo-2,4,6-triethyl-α-methylbenzeneacetonitrile |

By the use of Method B, the following compounds are made:

TABLE XVII

| Starting Material | Product |
|---|---|
| 3-bromo-5-tert-butyl-2-isopropylbenzeneacetonitrile | 3-bromo-5-tert-butyl-2-isopropyl-α,α-dimethylbenzeneacetonitrile |
| 3-bromo-2,4,6-triisopropylbenzeneacetonitrile | 3-bromo-2,4,6-triisopropyl-α,α-dimethylbenzeneacetonitrile |
| 4-bromo-5-sec-butyl-2-nitrobenzeneacetonitrile | 4-bromo-5-sec-butyl-α,α-dimethyl-2-nitrobenzeneacetonitrile |

Alkylbenzenes can be nitrated in the same manner as described in Example 16, except that the temperature is maintained at 0°C. When the indicated alkylbenzenes are nitrated, the resulting nitro compounds can be used for the preparation of the following anilines:

TABLE XVIII

| Starting Material | Product |
| --- | --- |
| p-diisobutylbenzene | 1,4-diisobutyl-2-nitrobenzene |
| m-diisopropylbenzene | 2,4-diisopropyl-1-nitrobenzene |
| p-(1,2-dimethylpropyl)ethylbenzene | 4-(1,2-dimethylpropyl)-1-ethyl-2-nitrobenzene |
| p-di-sec-butylbenzene | 2,5-di-sec-butylnitrobenzene |
| p-dipropylbenzene | 1-nitro-2,5-dipropylbenzene |
| p-diisopropylbenzene | 2,5-diisopropylnitrobenzene |
| p-isobutylcumene | 2-isobutyl-5-isopropylnitrobenzene |
| p-tert-butylcumene | 5-tert-butyl-2-isopropylnitrobenzene |
| p-sec-butylcumene | 5-sec-butyl-2-isopropylnitrobenzene |
| p-tert-pentylcumene | 2-isopropyl-1-nitro-5-tert-pentylbenzene |

EXAMPLE 14

2,5-Diisobutylaniline

A solution of 22.5 parts of 1,4-diisobutyl-2-nitrobenzene in 75 parts of ethanol is hydrogenated in the presence of 0.4 part platinum oxide catalyst in a Parr hydrogenation apparatus until 0.3 molar equivalents of hydrogen is consumed. The catalyst is filtered off; the ethanol is removed; and 2,5-diisobutylaniline is recovered.

By replacing 1,4-diisobutyl-2-nitrobenzene with the following nitro compounds, these anilines are obtained:

TABLE XIX

| Starting Material | Product |
| --- | --- |
| 2,4-diisopropylnitrobenzene | 2,4-diisopropylaniline |
| 4-(1,2-dimethylpropyl)-1-ethyl-2-nitrobenzene | 5-(1,2-dimethylpropyl)-2-ethylaniline |
| 1-ethyl-2-nitro-4-(1,1,2,2-tetramethyl)benzene | 2-ethyl-5-(1,1,2,2-tetramethyl)aniline |
| 2,5-di-sec-butylnitrobenzene | 2,5-di-sec-butylaniline |
| 1-nitro-2,5-dipropylbenzene | 2,5-dipropylaniline |
| 2,5-diisopropylnitrobenzene | 2,5-diisopropylaniline |
| 2-isobutyl-5-isopropylnitrobenzene | 2-isobutyl-5-isopropylaniline |
| 5-tert-butyl-2-isopropylnitrobenzene | 5-tert-butyl-2-isopropylaniline |

EXAMPLE 15

2,6-Diethylacetanilide

A solution of 74.5 parts of 2,6-diethylaniline in 200 parts of dimethylformamide is treated with 56 parts of acetic anhydride at 10°C. The mixture is stirred at 40° for 1 hour, poured into ice and water and stirred. The solid 2,6-diethylacetanilide is filtered, washed with water and dried.

EXAMPLE 16

2,6-Diethyl-4-nitroaniline

A solution of 58 parts of 2,6-diethylacetanilide in 100 parts of glacial acetic acid and 184 parts of concentrated sulfuric acid is treated at 10° with a mixture of 19.5 parts by volume of concentrated nitric acid and 13 parts by volume of concentrated sulfuric acid. After addition is completed, the mixture is stirred at 25°C for 1 hour. It is then poured into water and ice, and the solid filtered, washed with water and dried. The 2,6-diethyl-4-nitroacetanilide (30 parts) is treated with 150 parts by volume of refluxing 70% sulfuric acid solution for one hour, and the mixture poured onto ice and made basic with 5N sodium hydroxide solution. The solid 2,6-diethyl-4-nitroaniline is filtered, washed with water and recrystallized from methyl alcohol-water.

EXAMPLE 17

3,5-Diethylnitrobenzene

A solution of 19.4 parts of 2,6-diethyl-4-nitroaniline in 40 parts by volume of concentrated hydrochloric acid is diluted with 80 parts of water and added to 100 parts of ice. A solution of 7 parts of sodium nitrite in 15 parts of water is added and the filtered diazonium solution treated with 150 parts by volume of 50% hypophosphorous acid and kept cold for 24 hours. The 3,5-diethylnitrobenzene which separates is extracted with ether and distilled, b.p. 190°/20mm.

The following dialkylnitrobenzenes are made from the appropriate dialkylnitroanilines by the above procedure.

TABLE XX

| Starting Material | Product |
| --- | --- |
| 4-nitro-2,6-dipropylaniline | 1-nitro-3,5-dipropylbenzene |
| 2,6-diisopropyl-4-nitroaniline | 3,5-diisopropylnitrobenzene |
| 2,6-diisobutyl-4-nitroaniline | 3,5-diisobutylnitrobenzene |
| 2-ethyl-6-isopropyl-4-nitroaniline | 3-ethyl-5-isopropylnitrobenzene |
| 2-isobutyl-4-nitro-6-propylaniline | 3-isobutyl-1-nitro-5-propylbenzene |
| 2,6-di-sec-butyl-4-nitroaniline | 3,5-di-sec-butylnitrobenzene |
| 2-sec-butyl-6-isopropyl-4-nitroaniline | 3-sec-butyl-5-isopropylnitrobenzene |
| 2,6-di-tert-butyl-4-nitroaniline | 3,5-di-tert-butylnitrobenzene |

EXAMPLE 18

2,6-Diethyl-4-nitrobenzyl Chloride and 2,4-Diethyl-6-nitrobenzyl Chloride 3,5-Diethylnitrobenzene (10 parts) is dissolved in 29 parts of chloromethylmethyl ether, and 10 parts of 60% fuming sulfuric acid is added slowly with stirring. After standing for 5 minutes, the dark hot mixture is diluted with water and the precipitate is filtered and dried. Distillation under reduced pressure first gives the starting material and then a mixture of 2,6-diethyl-4-nitrobenzyl chloride and 2,4-diethyl-6-nitrobenzyl chloride. These are separated by chromatography and fractional crystallization.

The following dialkylnitrobenzyl chlorides are made from the appropriate dialkylnitrobenzenes by the above procedure.

TABLE XXI

| Starting Material | Product |
|---|---|
| 1-nitro-3,5-dipropylbenzene | 4-nitro-2,6-dipropylbenzyl chloride |
| | 6-nitro-2,4-dipropylbenzyl chloride |
| 3,5-diisopropylnitrobenzene | 2,6-diisopropyl-4-nitrobenzyl chloride |
| | 2,4-diisopropyl-6-nitrobenzyl chloride |
| 3,5-diisobutylnitrobenzene | 2,6-diisobutyl-4-nitrobenzyl chloride |
| | 2,4-diisobutyl-6-nitrobenzyl chloride |
| 3-isobutyl-1-nitro-5-propylbenzene | 2-isobutyl-4-nitro-6-propylbenzyl chloride |
| | 4-isobutyl-6-nitro-2-propylbenzyl chloride |
| 3-ethyl-5-isopropylnitrobenzene | 2-ethyl-6-isopropyl-4-nitrobenzyl chloride |
| | 2-ethyl-4-isopropyl-6-nitrobenzyl chloride |
| 3,5-di-sec-butylnitrobenzene | 2,6-di-sec-butyl-4-nitrobenzyl chloride |
| | 2,4-di-sec-butyl-6-nitrobenzyl chloride |
| 3,5-di-tert-butylnitrobenzene | 2,6-di-tert-butyl-4-nitrobenzyl chloride |
| | 2,4-di-tert-butyl-6-nitrobenzyl chloride |
| 3-sec-butyl-5-isopropylnitrobenzene | 2-sec-butyl-6-isopropyl-4-nitrobenzyl chloride |
| | 4-sec-butyl-2-isopropyl-6-nitrobenzyl chloride |

EXAMPLE 19

3-Bromo-2,6-diethyl-4-nitrobenzeneacetonitrile 2,6-Diethyl-4-nitrobenzyl chloride is brominated to give 3-bromo-2,6-diethyl-4-nitrobenzyl chloride by the procedure used to prepare 4-bromo-2-isobutyl-5-isopropylbenzyl chloride. 3-Bromo-2,6-diethyl-4-nitrobenzyl chloride is then converted to 3-bromo-2,6-diethyl-4-nitrobenzeneacetonitrile with sodium cyanide by the procedure used to prepare 4-bromo-2,5-diisopropylbenzeneacetonitrile.

The following 2,6-dialkyl-3-halo-4-nitrobenzeneacetonitriles are made from the appropriate 2,6-dialkyl-4-nitrobenzyl chlorides using the above procedure.

TABLE XXII

| Starting Material | Product |
|---|---|
| 4-nitro-2,6-dipropylbenzyl chloride | 3-bromo-4-nitro-2,6-dipropylbenzeneacetonitrile |
| 2,6-diisopropyl-4-nitrobenzyl chloride | 3-chloro-2,6-diisopropyl-4-nitrobenzeneacetonitrile |
| 2,6-diisobutyl-4-nitrobenzyl chloride | 3-bromo-2,6-diisobutyl-4-nitrobenzeneacetonitrile |
| 2-isobutyl-4-nitro-6-propylbenzyl chloride | 3-iodo-2-isobutyl-4-nitro-6-propylbenzeneacetonitrile |
| 2-ethyl-6-isopropyl-4-nitrobenzyl chloride | 3-bromo-2-ethyl-6-isopropyl-4-nitrobenzeneacetonitrile |
| 2,6-di-sec-butyl-4-nitrobenzyl chloride | 2,6-di-sec-butyl-3-chloro-4-nitrobenzeneacetonitrile |
| 2,6-di-tert-butyl-4-nitrobenzyl chloride | 3-bromo-2,6-di-tert-butyl-4-nitrobenzeneacetonitrile |
| 2-sec-butyl-6-isopropyl-4-nitrobenzyl chloride | 5-bromo-2-sec-butyl-6-isopropyl-4-nitrobenzeneacetonitrile |

EXAMPLE 20

3-Bromo-2,4-diethyl-6-nitrobenzeneacetonitrile and 5-Bromo-2,4-diethyl-6-nitrobenzeneacetonitrile 2,4-Diethyl-6-nitrobenzyl chloride is brominated by the procedure used to prepare 4-bromo-2-isobutyl-5-isopropylbenzyl chloride to form a mixture containing 3-bromo-2,4-diethyl-6-nitrobenzyl chloride and 5-bromo-2,4-diethyl-6-nitrobenzyl chloride. This mixture is treated with sodium cyanide by the method used to prepare 4-bromo-2,5-diisopropylbenzeneacetonitrile to give a mixture containing 3-bromo-2,4-diethyl-6-nitrobenzeneacetonitrile and 5-bromo-2,4-diethyl-6-nitrobenzeneacetonitrile. These compounds can be separated by fractional crystallization or chromatography, but the mixture itself is useful in the herbicidal methods and compositions of this invention.

The following 2,4-dialkyl-3(or 5)-halo-6-nitrobenzeneacetonitriles are made from the appropriate 2,4-dialkyl-6-nitrobenzyl chloride by the above procedure.

TABLE XXIII

| Starting Material | Product |
|---|---|
| 6-nitro-2,4-dipropylbenzyl chloride | 3-bromo-6-nitro-2,4-dipropylbenzeneacetonitrile |
| | 5-bromo-6-nitro-2,4-dipropylbenzeneacetonitrile |
| 2,4-diisopropyl-6-nitrobenzyl chloride | 3-bromo-2,4-diisopropyl-6-nitrobenzeneacetonitrile |
| | 5-bromo-2,4-diisopropyl-6-nitrobenzeneacetonitrile |
| 2,4-diisobutyl-6-nitrobenzyl chloride | 3-bromo-2,4-diisobutyl-6-nitrobenzeneacetonitrile |
| | 5-bromo-2,4-diisobutyl-6-nitrobenzeneacetonitrile |
| 2,4-di-sec-butyl-6-nitrobenzyl chloride | 2,4-di-sec-butyl-3-chloro-6-nitrobenzeneacetonitrile |
| | 2,4-di-sec-butyl-5-chloro-6-nitrobenzeneacetonitrile |
| 2,4-di-tert-butyl-6-nitrobenzyl chloride | 3-bromo-2,4-di-tert-butyl-6-nitrobenzeneacetonitrile |
| | 5-bromo-2,4-di-tert-butyl-6-nitrobenzeneacetonitrile |
| 4-sec-butyl-2-isopropyl-6-nitrobenzyl chloride | 4-sec-butyl-3-chloro-2-isopropyl-6-nitrobenzeneacetonitrile |
| | 4-sec-butyl-5-chloro-2-isopropyl-6-nitrobenzeneacetonitrile |

EXAMPLE 21

4-Bromo-2,5-diisobutyl-3-nitrobenzeneacetonitrile 2,5-Diisobutylnitrobenzene is treated with chloromethylmethyl ether in the presence of 60% fuming sulfuric acid by the procedure used to prepare 2,6-diethyl-4-nitrobenzyl chloride to yield 2,5-diisobutyl-3-nitrobenzyl chloride. This is brominated by the procedure used to prepare 4-bromo-2-isobutyl-5-isopropylbenzyl chloride to form 4-bromo-2,5-diisobutyl-3-nitrobenzyl chloride and 6-bromo-2,5-diisobutyl-3-nitrobenzyl chloride. This mixture is separated by fractional crystallization or chromatography and the 4-bromo-2,5-diisobutyl-3-nitrobenzyl chloride is treated with sodium cyanide by the procedure used to prepare 4-bromo-2,5-diisopropylbenzeneacetonitrile to give 4-bromo-2,5-diisobutyl-3-nitrobenzeneacetonitrile.

The following compounds are made by appropriate substitution in the preceding procedures.

sitions of this invention. The following are examples of the preparation of nitrohalobenzeneacetonitrile mixtures.

TABLE XXV

| Starting Material | Product |
|---|---|
| 3-bromo-2,6-diisobutylbenzeneacetonitrile and 4-bromo-2,6-diisobutylbenzeneacetonitrile | 3-bromo-2,6-diisobutyl-5-nitrobenzeneacetonitrile and 4-bromo-2,6-diisobutyl-3-nitrobenzeneacetonitrile |
| 3-bromo-2,4-diethylbenzeneacetonitrile and 4-bromo-3,5-diethylbenzeneacetonitrile | 3-bromo-2,4-diethyl-5-nitrobenzeneacetonitrile and 4-bromo-3,5-diethyl-2-nitrobenzeneacetonitrile |
| 3-bromo-2-ethyl-5-neopentylbenzeneacetonitrile and 4-bromo-5-ethyl-2-neopentylbenzeneacetonitrile | 3-bromo-2-ethyl-5-neopentyl-6-nitrobenzeneacetonitrile; 3-bromo-2-ethyl-5-neopentyl-4-nitrobenzeneacetonitrile and 4-bromo-5-ethyl-2-neopentyl-6-nitrobenzeneacetonitrile |

EXAMPLE 22

4,5-Dichloro-2-nitro-3,6-dipropylbenzeneacetonitrile

To 38 parts of 90% nitric acid is added portionwise 5 parts of 3,4-dichloro-2,5-dipropylbenzeneacetonitrile at such a rate that the temperature does not exceed 50°C. The solution is stirred for 2 hours at room temperature then poured into ice water. The organic phase is extracted with ether and the ethereal solution washed with water, 2% sodium hydroxide, and water. The dried ethereal solution is vacuum distilled to remove solvent and the residue is recrystallized to afford pure 4,5-dichloro-2-nitro-3,6-dipropylbenzenediacetonitrile.

By replacing 3,4-dichloro-2,5-dipropylbenzeneacetonitrile with the following benzeneacetonitriles, the following products are obtained. In some cases nitrated isomer mixtures are obtained. These can be separated by fractional crystallization, chromatography, distillation or other techniques, but the mixtures themselves are useful in the herbicidal methods and compositions of this invention.

TABLE XXIV

| Starting Material | Product |
|---|---|
| 2,5-di-sec-butylnitrobenzene | 2,5-di-sec-butyl-4-chloro-3-nitrobenzeneacetonitrile |
| 1-nitro-2,5-dipropylbenzene | 4-bromo-3-nitro-2,5-dipropylbenzeneacetonitrile |
| 2,5-diisopropylnitrobenzene | 4-bromo-2,5-diisopropyl-3-nitrobenzeneacetonitrile |
| 2-isobutyl-5-isopropylnitrobenzene | 4-bromo-2-isobutyl-5-isopropyl-3-nitrobenzeneacetonitrile |
| 5-tert-butyl-2-isopropylnitrobenzene | 5-tert-butyl-4-chloro-2-isopropyl-3-nitrobenzeneacetonitrile |
| 5-sec-butyl-2-isopropylnitrobenzene | 5-sec-butyl-4-chloro-2-isopropyl-3-nitrobenzeneacetonitrile |
| 2-isopropyl-1-nitro-5-tert-pentylbenzene | 4-bromo-2-isopropyl-3-nitro-5-tert-pentylbenzeneacetonitrile |

When one nitrates mixtures of halobenzeneacetonitriles, mixtures of nitrohalobenzeneacetonitriles are obtained. These can be separated by fractional crystallization or chromatography, but the mixtures themselves are useful in the herbicidal methods and compositions of this invention.

TABLE XXVI

| Starting Material | Product |
|---|---|
| 3,4-dichloro-2,5-diethylbenzeneacetonitrile | 4,5-dichloro-3,6-diethyl-2-nitrobenzeneacetonitrile |
| 3,4-dichloro-2,5-dipropylbenzeneacetonitrile | 4,5-dichloro-2-nitro-3,6-dipropylbenzeneacetonitrile |
| 3,4-dibromo-2,5-dipropylbenzeneacetonitrile | 4,5-dibromo-2-nitro-3,6-dipropylbenzeneacetonitrile |
| 3,4-dichloro-2,5-diisobutylbenzeneacetonitrile | 4,5-dichloro-3,6-diisobutyl-2-nitrobenzeneacetonitrile |
| 3,4-dibromo-2,5-diisobutylbenzeneacetonitrile | 4,5-dibromo-3,6-diisobutyl-2-nitrobenzeneacetonitrile |
| 2,5-di-tert-butyl-3,4-dichlorobenzeneacetonitrile | 3,6-di-tert-butyl-4,5-dichloro-2-nitrobenzeneacetonitrile |
| 5-tert-butyl-3,4-dichloro-2-ethylbenzeneacetonitrile | 3-tert-butyl-4,5-dichloro-6-ethyl-2-nitrobenzeneacetonitrile |
| 5-tert-butyl-3,4-dichloro-2-propylbenzeneacetonitrile | 3-tert-butyl-4,5-dichloro-2-nitro-6-propylbenzeneacetonitrile |
| 2-tert-butyl-3,4-dichloro-5-propylbenzeneacetonitrile | 6-tert-butyl-4,5-dichloro-2-nitro-3-propylbenzeneacetonitrile |

TABLE XXVI-continued

| Starting Material | Product |
|---|---|
| 2-tert-butyl-3,4-dichloro-5-isopropylbenzeneacetonitrile | 6-tert-butyl-4,5-dichloro-3-isopropyl-2-nitrobenzeneacetonitrile |
| 5-sec-butyl-2-tert-butyl-3,4-dichlorobenzeneacetonitrile | 3-sec-butyl-6-tert-butyl-4,5-dichloro-2-nitrobenzeneacetonitrile |
| 5-sec-butyl-3,4-dichloro-2-isobutylbenzeneacetonitrile | 3-sec-butyl-4,5-dichloro-6-isobutyl-2-nitrobenzeneacetonitrile |
| 3,4-dichloro-2-isobutyl-5-isopropylbenzeneacetonitrile | 4,5-dichloro-6-isobutyl-3-isopropyl-2-nitrobenzeneacetonitrile |
| 2,4-dichloro-3,5-diethylbenzeneacetonitrile | 2,4-dichloro-3,5-diethyl-6-nitrobenzeneacetonitrile |
| 2,4-dichloro-3,5-dipropylbenzeneacetonitrile | 2,4-dichloro-6-nitro-3,5-dipropylbenzeneacetonitrile |
| 2,4-dichloro-3,5-diisopropylbenzeneacetonitrile | 2,4-dichloro-3,5-diisopropyl-6-nitrobenzeneacetonitrile |
| 2,4-dichloro-3,5-diisobutylbenzeneacetonitrile | 2,4-dichloro-3,5-diisobutyl-6-nitrobenzeneacetonitrile |
| 3,5-di-sec-butyl-2,4-dichlorobenzeneacetonitrile | 3,5-di-sec-butyl-2,4-dichloro-6-nitrobenzeneacetonitrile |
| 2,4-dibromo-3,5-di-sec-butylbenzeneacetonitrile | 2,4-dibromo-3,5-di-sec-butyl-6-nitrobenzeneacetonitrile |
| 2,4-dibromo-3,5-diisobutylbenzeneacetonitrile | 2,4-dibromo-3,5-diisobutyl-6-nitrobenzeneacetonitrile |
| 2,4-dibromo-3,5-di-tert-butylbenzeneacetonitrile | 2,4-dibromo-3,5-di-tert-butyl-6-nitrobenzeneacetonitrile |
| 3,5-di-tert-butyl-2,4-dichlorobenzeneacetonitrile | 3,5-di-tert-butyl-2,4-dichloro-6-nitrobenzeneacetonitrile |
| 5-tert-butyl-2,4-dichloro-3-ethylbenzeneacetonitrile | 5-tert-butyl-2,4-dichloro-3-ethyl-6-nitrobenzeneacetonitrile |
| 5-tert-butyl-2,4-dichloro-3-propylbenzeneacetonitrile | 5-tert-butyl-2,4-dichloro-6-nitro-3-propylbenzeneacetonitrile |
| 5-tert-butyl-2,4-dichloro-3-isopropylbenzeneacetonitrile | 5-tert-butyl-2,4-dichloro-3-isopropyl-6-nitrobenzeneacetonitrile |
| 5-tert-butyl-2,4-dichloro-3-isobutylbenzeneacetonitrile | 5-tert-butyl-2,4-dichloro-3-isobutyl-6-nitrobenzeneacetonitrile |
| 3-sec-butyl-5-tert-butyl-2,4-dichlorobenzeneacetonitrile | 3-sec-butyl-5-tert-butyl-2,4-dichloro-6-nitrobenzeneacetonitrile |
| 2,4-dibromo-5-tert-butyl-3-ethylbenzeneacetonitrile | 2,4-dibromo-5-tert-butyl-3-ethyl-6-nitrobenzeneacetonitrile |
| 2,4-dibromo-3-isobutyl-5-isopropylbenzeneacetonitrile | 2,4-dibromo-3-isobutyl-5-isopropyl-6-nitrobenzeneacetonitrile |
| 2,4-dichloro-3-isobutyl-5-isopropylbenzeneacetonitrile | 2,4-dichloro-3-isobutyl-5-isopropyl-6-nitrobenzeneacetonitrile |
| 5-sec-butyl-2,4-dichloro-3-isobutylbenzeneacetonitrile | 5-sec-butyl-2,4-dichloro-3-isobutyl-6-nitrobenzeneacetonitrile |
| 2,4-dibromo-5-sec-butyl-3-isobutylbenzeneacetonitrile | 2,4-dibromo-5-sec-butyl-3-isobutyl-6-nitrobenzeneacetonitrile |
| 5-sec-butyl-2,4-dichloro-3-isopropylbenzeneacetonitrile | 5-sec-butyl-2,4-dichloro-3-isopropyl-6-nitrobenzeneacetonitrile |
| 2,3-dichloro-4,6-diethylbenzeneacetonitrile | 2,3-dichloro-4,6-diethyl-5-nitrobenzeneacetonitrile |
| 2,3-dibromo-4,6-diethylbenzeneacetonitrile | 2,3-dibromo-4,6-diethyl-5-nitrobenzeneacetonitrile |
| 2,3-dibromo-4,6-dipropylbenzeneacetonitrile | 2,3-dibromo-5-nitro-4,6-dipropylbenzeneacetonitrile |
| 2,3-dichloro-4,6-dipropylbenzeneacetonitrile | 2,3-dichloro-5-nitro-4,6-dipropylbenzeneacetonitrile |
| 2,3-dichloro-4,6-diisobutylbenzeneacetonitrile | 2,3-dichloro-4,6-diisobutyl-5-nitrobenzeneacetonitrile |
| 2,3-dibromo-4,6-diisobutylbenzeneacetonitrile | 2,3-dibromo-4,6-diisobutyl-5-nitrobenzeneacetonitrile |
| 2,3-dibromo-4,6-di-tert-butylbenzeneacetonitrile | 2,3-dibromo-4,6-di-tert-butyl-5-nitrobenzeneacetonitrile |
| 4,6-di-tert-butyl-2,3-dichlorobenzeneacetonitrile | 4,6-di-tert-butyl-2,3-dichloro-5-nitrobenzeneacetonitrile |
| 6-tert-butyl-2,3-dichloro-4-ethylbenzeneacetonitrile | 6-tert-butyl-2,3-dichloro-4-ethyl-5-nitrobenzeneacetonitrile |
| 2,3-dibromo-6-tert-butyl-4-propylbenzeneacetonitrile | 2,3-dibromo-6-tert-butyl-5-nitro-4-propylbenzeneacetonitrile |
| 2,3-dibromo-6-tert-butyl-4-isopropylbenzeneacetonitrile | 2,3-dibromo-6-tert-butyl-4-isopropyl-5-nitrobenzeneacetonitrile |
| 6-tert-butyl-2,3-dichloro-4-isobutylbenzeneacetonitrile | 6-tert-butyl-2,3-dichloro-4-isobutyl-5-nitrobenzeneacetonitrile |
| 6-tert-butyl-4-sec-butyl-2,3-dichlorobenzeneacetonitrile | 6-tert-butyl-4-sec-butyl-2,3-dichloro-5-nitrobenzeneacetonitrile |
| 2,3-dibromo-4-sec-butyl-6-tert-butylbenzene- | 2,3-dibromo-4-sec-butyl-6-tert-butyl-5-nitro- |

TABLE XXVI-continued

| Starting Material | Product |
|---|---|
| acetonitrile | benzeneacetonitrile |
| 2,3-dibromo-6-sec-butyl-4-tert-butylbenzene-acetonitrile | 2,3-dibromo-6-sec-butyl-4-tert-butyl-5-nitro-benzeneacetonitrile |
| 6-sec-butyl-4-tert-butyl-2,3-dichlorobenzene-acetonitrile | 6-sec-butyl-4-tert-butyl-2,3-dichloro-5-nitro-benzeneacetonitrile |
| 4-tert-butyl-2,3-dichloro-6-isobutylbenzene acetonitrile | 4-tert-butyl-2,3-dichloro-6-isobutyl-5-nitro-benzeneacetonitrile |
| 2,3-dibromo-6-isobutyl-4-isopropylbenzene-acetonitrile | 2,3-dibromo-6-isobutyl-4-isopropyl-5-nitro-benzeneacetonitrile |
| 4-sec-butyl-2,3-dichloro-6-propylbenzene-acetonitrile | 4-sec-butyl-2,3-dichloro-5-nitro-6-propyl-benzeneacetonitrile |
| 3,5-dibromo-2,4-diethylbenzeneacetonitrile | 3,5-dibromo-2,4-diethyl-6-nitrobenzeneacetonitrile |
| 3,5-dichloro-2,4-dipropylbenzeneacetonitrile | 3,5-dichloro-6-nitro-2,4-dipropylbenzeneacetonitrile |
| 3,5-dibromo-2,4-diisopropylbenzeneacetonitrile | 3,5-dibromo-2,4-diisopropyl-6-nitrobenzene-acetonitrile |
| 3,5-dichloro-2,4-diisobutylbenzeneacetonitrile | 3,5-dibromo-2,4-diisobutyl-6-nitrobenzeneaceto-nitrile |
| 3,5-dichloro-2,4-diisobutylbenzeneacetonitrile | 3,5-dichloro-2,4-diisobutyl-6-nitrobenzeneaceto-nitrile |
| 2,4-di-sec-butyl-3,5-dichlorobenzeneaceto-nitrile | 2,4-di-sec-butyl-3,5-dichloro-6-nitrobenzeneaceto-nitrile |
| 3,5-dibromo-2,4-di-sec-butylbenzeneacetonitrile | 3,5-dibromo-2,4-di-sec-butyl-6-nitrobenzeneaceto-nitrile |
| 3,5-dibromo-2,4-di-tert-butylbenzeneacetonitrile | 3,5-dibromo-2,4-di-tert-butyl-6-nitrobenzeneaceto-nitrile |
| 2,4-di-tert-butyl-3,5-dichlorobenzeneaceto nitrile | 2,4-di-tert-butyl-3,5-dichloro-6-nitrobenzene-acetonitrile |
| 2-tert-butyl-3,5-dichloro-4-ethylbenzene-acetonitrile | 2-tert-butyl-3,5-dichloro-4-ethyl-6-nitrobenzene-acetonitrile |
| 4-tert-butyl-3,5-dichloro-2-ethylbenzene-acetonitrile | 4-tert-butyl-3,5-dichloro-2-ethyl-6-nitrobenzene-acetonitrile |
| 4-tert-butyl-3,5-dichloro-2-propylbenzene-acetonitrile | 4-tert-butyl-3,5-dichloro-6-nitro-2-propylbenzene-acetonitrile |
| 4-tert-butyl-3,5-dichloro-2-isopropylbenzene-acetonitrile | 4-tert-butyl-3,5-dichloro-2-isopropyl-6-nitro-benzeneacetonitrile |
| 4-tert-butyl-3,5-dichloro-2-isobutylbenzene-acetonitrile | 4-tert-butyl-3,5-dichloro-2-isobutyl-6-nitro-benzeneacetonitrile |
| 2-tert-butyl-4-sec-butyl-3,5-dichlorobenzene-acetonitrile | 2-tert-butyl-4-sec-butyl-3,5-dichloro-6-nitro-benzeneacetonitrile |
| 4-sec-butyl-3,5-dichloro-2-isopropylbenzene acetonitrile | 4-sec-butyl-3,5-dichloro-2-isopropyl-6-nitro-benzeneacetonitrile |
| 3,5-dibromo-2-isobutyl-4-isopropylbenzene-acetonitrile | 3,5-dibromo-2-isobutyl-4-isopropyl-6-nitro-benzeneacetonitrile |
| 3,5-dibromo-4-isobutyl-2-iospropylbenzene-acetonitrile | 3,5-dibromo-4-isobutyl-2-isopropyl-6-nitrobenzene acetonitrile |
| 4-sec-butyl-3,5-dichloro-2-isobutylbenzene-acetonitrile | 4-sec-butyl-3,5-dichloro-2-isobutyl-6-nitro-benzeneacetonitrile |
| 3,4-dichloro-2,6-diethylbenzeneacetonitrile | 3,4-dichloro-2,6-diethyl-5-nitrobenzeneaceto-nitrile |
| 3,4-dibromo-2,6-diethylbenzeneacetonitrile | 3,4-dibromo-2,6-diethyl-5-nitrobenzeneacetonitrile |
| 3,4-dibromo-2,6-dipropylbenzeneacetonitrile | 3,4-dibromo-5-nitro-2,6-dipropylbenzeneacetonitrile |
| 3,4-dichloro-2,6-dipropylbenzeneacetonitrile | 3,4-dichloro-5-nitro-2,6-dipropylbenzeneacetonitrile |
| 3,4-dichloro-2,6-diisobutylbenzeneacetonitrile | 3,4-dichloro-2,6-diisobutyl-5-nitrobenzeneacetonitrile |
| 3,4-dibromo-2,6-diisobutylbenzeneacetonitrile | 3,4-dibromo-2,6-diisobutyl-5-nitrobenzeneacetonitrile |
| 3,4-dibromo-2,6-di-tert-butylbenzeneacetonitrile | 3,4-dibromo-2,6-di-tert-5-nitrobenzeneacetonitrile |
| 3,4-dichloro-2-ethyl-6-propylbenzeneaceto-nitrile | 3,4-dichloro-2-ethyl-5-nitro-6-propylbenzeneaceto-nitrile |
| 3,4-dibromo-2-tert-butyl-6-ethylbenzene-acetonitrile | 3,4-dibromo-2-tert-butyl-6-ethyl-5-nitrobenzene-acetonitrile |
| 2-tert-butyl-3,4-dichloro-6-isobutylbenzene-acetonitrile | 2-tert-butyl-3,4-dichloro-6-isobutyl-5-nitro-benzeneacetonitrile |
| 2-tert-butyl-3,4-dichloro-6-propylbenzene-acetonitrile | 2-tert-butyl-3,4-dichloro-5-nitro-6-propylbenzene acetonitrile |
| 3,4-dibromo-2-tert-butyl-6-propylbenzene-acetonitrile | 3,4-dibromo-2-tert-butyl-5-nitro-6-propylbenzene-acetonitrile |
| 3,4-dibromo-2-tert-butyl-6-isobutylbenzene-acetonitrile | 3,4-dibromo-2-tert-butyl-6-isobutyl-5-nitrobenzene-acetonitrile |
| 3,4-dichloro-2,5-diethylbenzeneacetonitrile | 3,4-dichloro-2,5-diethyl-6-nitrobenzeneacetonitrile |
| 3,4-dibromo-2,5-dipropylbenzeneacetonitrile | 3,4-dibromo-6-nitro-2,5-dipropylbenzeneacetonitrile |

TABLE XXVI-continued

| Starting Material | Product |
|---|---|
| 3,4-dibromo-2,5-diisobutylbenzeneacetonitrile | 3,4-dibromo-2,5-diisobutyl-6-nitrobenzeneacetonitrile |
| 3,4-dichloro-2,5-diisobutylbenzeneacetonitrile | 3,4-dichloro-2,5-diisobutyl-6-nitrobenzeneacetonitrile |
| 2,5-di-tert-butyl-3,4-dichlorobenzeneaceto- | 2,5-di-tert-butyl-3,4-dichloro-6-nitrobenzeneacetonitrile |
| 3,4-dibromo-2,5-di-tert-butylbenzeneacetonitrile | 3,4-dibromo-2,5-di-tert-butyl-6-nitrobenzeneacetonitrile |
| 3,4-dichloro-2-ethyl-5-isobutylbenzeneacetonitrile | 3,4-dichloro-2-ethyl-5-isobutyl-6-nitrobenzeneacetonitrile |
| 3,4-dibromo-5-tert-butyl-2-isopropylbenzeneacetonitrile | 3,4-dibromo-5-tert-butyl-2-isopropyl-6-nitrobenzeneacetonitrile |
| 3,4-dibromo-5-tert-butyl-2-isobutylbenzeneacetonitrile | 3,4-dibromo-5-tert-butyl-2-isobutyl-6-nitrobenzeneacetonitrile |
| 5-tert-butyl-3,4-dichloro-2-propylbenzeneacetonitrile | 5-tert-butyl-3,4-dichloro-6-nitro-2-propylbenzeneacetonitrile |
| 2-tert-butyl-3,4-dichloro-5-propylbenzeneacetonitrile | 2-tert-butyl-3,4-dichloro-6-nitro-5-propylbenzeneacetonitrile |
| 5-tert-butyl-2-sec-butyl-3,4-dichlorobenzeneacetonitrile | 5-tert-butyl-2-sec-butyl-3,4-dichloro-6-nitrobenzeneacetonitrile |
| 3,4-dibromo-2-sec-butyl-5-isobutylbenzeneacetonitrile | 3,4-dibromo-2-sec-butyl-5-isobutyl-6-nitrobenzeneacetonitrile |
| 3,4-dichloro-2-ethyl-5-tert-pentylbenzeneacetonitrile | 3,4-dichloro-2-ethyl-6-nitro-5-tert-pentylbenzeneacetonitrile |
| 3,4-dichloro-5-(1,2-dimethylpropyl)-2-ethylbenzeneacetonitrile | 3,4-dichloro-5-(1,2-dimethylpropyl)-2-ethyl-6-nitrobenzeneacetonitrile |
| 3,6-dichloro-2,4-diethylbenzeneacetonitrile | 3,6-dichloro-2,4-diethyl-5-nitrobenzeneacetonitrile |
| 3,6-dibromo-2,4-diethylbenzeneacetonitrile | 3,6-dibromo-2,4-diethyl-5-nitrobenzeneacetonitrile |
| 3,6-dibromo-2,4-dipropylbenzeneacetonitrile | 3,6-dibromo-5-nitro-2,4-dipropylbenzeneacetonitrile |
| 3,6-dichloro-2,4-dipropylbenzeneacetonitrile | 3,6-dichloro-5-nitro-2,4-dipropylbenzeneacetonitrile |
| 3,6-dichloro-2,4-diisopropylbenzeneacetonitrile | 3,6-dichloro-2,4-diisopropyl-5-nitrobenzeneacetonitrile |
| 3,6-dibromo-2,4-diisopropylbenzeneacetonitrile | 3,6-dibromo-2,4-diisopropyl-5-nitrobenzeneacetonitrile |
| 3,6-dibromo-2,4-diisobutylbenzeneacetonitrile | 3,6-dibromo-2,4-diisobutyl-5-nitrobenzeneacetonitrile |
| 3,6-dichloro-2,4-diisobutylbenzeneacetonitrile | 3,6-dichloro-2,4-diisobutyl-5-nitrobenzeneacetonitrile |
| 2,4-di-sec-butyl-3,6-dichlorobenzeneacetonitrile | 2,4-di-butyl-3,6-dichloro-5-nitrobenzeneacetonitrile |
| 3,6-dibromo-2,4-di-sec-butylbenzeneacetonitrile | 3,6-dibromo-2,4-di-sec-butyl-5-nitrobenzeneacetonitrile |
| 3,6-dibromo-2,4-di-tert-butylbenzeneacetonitrile | 3,6-dibromo-2,4-di-tert-butyl-5-nitrobenzeneacetonitrile |
| 2,4-di-tert-butyl-3,6-dichlorobenzeneacetonitrile | 2,4-di-tert-butyl-3,6-dichloro-5-nitrobenzeneacetonitrile |
| 2-tert-butyl-3,6-dichloro-4-ethylbenzeneacetonitrile | 2-tert-butyl-3,6-dichloro-4-ethyl-5-nitrobenzineacetonitrile |
| 2-tert-butyl-3,6-dichloro-4-isobutylbenzeneacetonitrile | 2-tert-butyl-3,6-dichloro-4-isobutyl-5-nitrobenzeneacetonitrile |
| 2-tert-butyl-3,6-dichloro-4-isopropylbenzeneacetonitrile | 2-tert-butyl-3,6-dichloro-4-isopropyl-5-nitrobenzeneacetonitrile |
| 4-sec-butyl-2-tert-butyl-3,6-dichlorobenzeneacetonitrile | 4-sec-butyl-2-tert-butyl-3,6-dichloro-5-nitrobenzeneacetonitrile |
| 3,6-dibromo-2-sec-butyl-4-tert-butylbenzeneacetonitrile | 3,6-dibromo-2-sec-butyl-4-tert-butyl-5-nitrobenzeneacetonitrile |
| 3,6-dibromo-4-tert-butyl-2-isobutylbenzeneacetonitrile | 3,6-dibromo-4-tert-butyl-2-isobutyl-5-nitrobenzeneacetonitrile |
| 3,6-dibromo-2-tert-butyl-4-isobutylbenzeneacetonitrile | 3,6-dibromo-2-tert-butyl-4-isobutyl-5-nitrobenzeneacetonitrile |
| 3,6-dichloro-2-isobutyl-4-isopropylbenzeneacetonitrile | 3,6-dichloro-2-isobutyl-4-isopropyl-5-nitrobenzeneacetonitrile |
| 3,6-dichloro-4-isobutyl-2-isopropylbenzeneacetonitrile | 3,6-dichloro-4-isobutyl-2-isopropyl-5-nitrobenzeneacetonitrile |
| 4-sec-butyl-3,6-dichloro-2-isobutylbenzeneacetonitrile | 4-sec-butyl-3,6-dichloro-2-isobutyl-5-nitrobenzeneacetonitrile |

EXAMPLE 23

3-Bromo-2,4,6-triisopropylbenzyl Chloride

To a solution of 25 parts of 2,4,6-triisopropylbenzyl chloride (Organic Reactions, Vol. I, p. 68) in 150 parts of carbon tetrachloride is added 1 part of iron powder. sulting solution is washed with dilute sodium bicarbonate solution and water. It is dried with magnesium sulfate and stripped of solvent in vacuo giving 3-bromo-2,4,6-triisopropylbenzyl chloride.

The following compounds are made by appropriate substitution in the above procedure.

TABLE XXVII

| Starting Material | Product |
|---|---|
| 2,4,6-tripropylbenzyl chloride | 3-bromo-2,4,6-tripropylbenzyl chloride |
| 4-tert-butyl-2,6-diisopropylbenzyl chloride | 3-bromo-4-tert-butyl-2,6-diisopropylbenzyl chloride |
| 2,6-diisopropyl-4-methylbenzyl chloride | 3-bromo-2,6-diisopropyl-4-methylbenzyl chloride |
| 2,4,6-triisopropylbenzyl chloride | 3-chloro-2,4,6-triisopropylbenzyl chloride |

The mixture is cooled and maintained at 15°–20°C, and then a solution of 16 parts bromine in 15 parts carbon tetrachloride is added dropwise during 2 hours. The The procedure of Example 23 is used to prepare the following compounds, but 2 moles of bromine are used per mole of substituted benzyl chloride.

TABLE XXVIII

| Starting Material | Product |
| --- | --- |
| 2,4,6-triisopropylbenzyl chloride | 3,5-dibromo-2,4,6-triisopropylbenzyl chloride |
| 4-tert-butyl-2,6-diisopropylbenzyl chloride | 3,5-dibromo-4-tert-butyl-2,6-diisopropylbenzyl chloride |
| 2,6-diisopropyl-4-methylbenzyl chloride | 3,5-dibromo-2,6-diisopropyl-4-methylbenzyl chloride |
| 2,4,6-triisopropylbenzyl chloride | 3,5-dichloro-2,4,6-triisopropylbenzyl chloride |

EXAMPLE 24

3-Bromo-2,4,6-triisopropylbenzeneacetonitrile

In a flask equipped with a mechanical stirrer and reflux condenser is placed 33 parts of finely powdered sodium cyanide and 100 parts of dimethyl sulfoxide. 3-Bromo-2,4,6-triisopropylbenzyl chloride (200 parts) is added with good stirring, and the temperature is maintained at 60°–65°C. by adjusting the addition rate of the benzyl chloride. After complete addition, the mixture is stirred for 0.5 hour at 65°C., cooled and diluted with 1000 parts of ice water. The reaction mixture is extracted with two portions of methylene chloride. The methylene chloride extracts are combined and dried. The solvent is removed under reduced pressure to yield 3-bromo-2,4,6-triisopropylbenzeneacetonitrile.

The following compounds are made by appropriate substitution in the above procedure.

formaldehyde and 88 parts of zinc chloride are added and the reaction continued at 75°C for a total of 6.5 hours. The reaction mixture is then diluted with 1500 parts ice, the crystals are collected, washed with ice water and cold (−15°C) pentane. After drying with suction to remove most of the pentane, the crystals are dissolved in methylene chloride. The resulting solution is washed 3 times with dilute (20%) hydrochloric acid, dried with anhydrous magnesium sulfate, and the solvent is removed under reduced pressure to afford essentially pure 4-chloromethyl-2,5-diisopropylbenzeneacetamide.

EXAMPLE 26

4-Chloromethyl-2,5-diisopropylbenzeneacetonitrile

A mixture of 7 parts of sodium chloride, 7 parts of 4-chloromethyl-2,5-diisopropylbenzeneacetamide, 7 parts of phosphorous oxychloride and 60 parts of ace-

TABLE XXIX

| Starting Material | Product |
| --- | --- |
| 3-bromo-2,4,6-tripropylbenzyl chloride | 3-bromo-2,4,6-tripropylbenzeneacetonitrile |
| 3-bromo-4-tert-butyl-2,6-diisopropylbenzyl chloride | 4-tert-butyl-3-bromo-2,6-diisopropylbenzeneacetonitrile |
| 3-bromo-2,6-diisopropyl-4-methylbenzyl chloride | 3-bromo-2,6-diisopropyl-4-methylbenzeneacetonitrile |
| 3-bromo-2,4,6-triethylbenzyl chloride | 3-bromo-2,4,6-triethylbenzeneacetonitrile |
| 3-chloro-2,4,6-triisopropylbenzyl chloride | 3-bromo-2,4,6-triisopropylbenzeneacetonitrile |

The procedure of Example 24 is used to prepare the following compounds.

tonitrile is stirred and refluxed for 4 hours. The insoluble materials are filtered off and the filtrate is concen-

TABLE XXX

| Starting Material | Product |
| --- | --- |
| 3,5-dibromo-2,4,6-triisopropylbenzyl chloride | 3,5-dibromo-2,4,6-triisopropylbenzeneacetonitrile |
| 3,5-dibromo-4-tert-butyl-2,6-diisopropylbenzyl chloride | 3,5-dibromo-4-tert-butyl-2,6-diisopropylbenzeneacetonitrile |
| 3,5-dibromo-2,6-diisopropyl-4-methylbenzyl chloride | 3,5-dibromo-2,6-diisopropyl-4-methylbenzeneacetonitrile |
| 3,5-dibromo-2,4,6-triethylbenzyl chloride | 3,5-dibromo-2,4,6-triethylbenzeneacetonitrile |
| 3-bromo-5-chloro-2,4,6-triisopropylbenzyl chloride | 3-bromo-5-chloro-2,4,6-triisopropylbenzeneacetonitrile |

EXAMPLE 25

4-Chloromethyl-2,5-diisopropylbenzeneacetamide

A stream of dry hydrogen chloride is passed into a mixture of 376 parts of 2,5-diisopropylphenylacetamide, 223 parts of paraformaldehyde and 115 parts of zinc chloride. This mixture is vigorously stirred and heated to 65°C for 3 hours. Additional 87 parts of paratrated under reduced pressure. Fractional distillation of the residue affords 4-chloromethyl-2,5-diisopropylbenzeneacetonitrile.

The following compounds are prepared by substituting the indicated starting material for 2,5-diisopropylbenzeneacetamide in Example 25 and then either chloromethylating or bromomethylating. Subsequent dehydration as in Example 26 yields the listed product.

TABLE XXXI

| Starting Material | Procedure | Product |
| --- | --- | --- |
| 2,4-diethylbenzeneacetamide | chloromethylation | 5-chloromethyl-2,4-diethylbenzeneacetonitrile |
| 3,5-di-n-propylbenzeneacetamide | chloromethylation | 4-chloromethyl-3,5-di-n-propylbenzeneacetonitrile |
| 2,6-di-tert-butylbenzeneacetamide | bromomethylation | 4-bromomethyl-2,6-di-tert-butylbenzeacetonitrile |
| 2-ethyl-4-(1,1,2,2-tetramethylpropyl)benzeneacetamide | chloromethylation | 5-chloromethyl-2-ethyl-4-(1,1,2,2-tetramethylpropyl)benzeneacetonitrile |
| 2-ethyl-6-isopropylbenzeneacetamide | chloromethylation | 4-chloromethyl-2-ethyl-6-isopropylbenzeneacetonitrile |

TABLE XXXI-continued

| Starting Material | Procedure | Product |
|---|---|---|
| 3-ethyl-5-isopropylbenzeneacetamide | bromomethylation | 4-bromomethyl-3-ethyl-5-isopropylbenzeneacetonitrile |
| 2,5-di-tert-butylbenzeneacetamide | bromomethylation | 4-bromomethyl-2,5-di-tert-butylbenzeneacetonitrile |
| 5-tert-butyl-2-ethylbenzeneacetamide | chloromethylation | 5-tert-butyl-3-chloromethyl-2-ethylbenzeneacetonitrile |
| 2,4,6-triethylbenzeneacetamide | chloromethylation | 3-chloromethyl-2,4,6-triethylbenzeneacetonitrile |
| 2,5-diisopropyl-α-methylbenzeneacetamide | chloromethylation | 3-chloromethyl-2,5-diisopropyl-α-methylbenzeneacetonitrile |
| 2-ethyl-4-isopropyl-α,α-dimethylbenzeneacetamide | chloromethylation | 5-chloromethyl-2-ethyl-4-isopropyl-α,α-di-methylbenzeneacetonitrile |
| 3-ethyl-5-neopentylbenzeneacetamide | chloromethylation | 4-chloromethyl-3-ethyl-5-neopentylbenzene acetonitrile |
| 2-isobutyl-6-n-propylbenzeneacetamide | bromomethylation | 4-bromomethyl-2-isobutyl-6-n-propylbenzene acetonitrile |
| 2,6-diisopropyl-α-methylbenzeneacetamide | chloromethylation | 4-chloromethyl-2,6-diisopropyl-α-methylbenzeneacetonitrile |
| 2,4-diisopropylbenzeneacetamide | chloromethylation | 5-chloromethyl-2,4-diisopropylbenzeneacetonitrile |
| 3-tert-butyl-5-isobutylbenzeneacetamide | bromomethylation | 4-bromomethyl-3-tert-butyl-5-isobutyl-benzeneacetonitrile |
| 2-sec-butyl-6-isopropylbenzeneacetamide | bromomethylation | 4-bromomethyl-2-sec-butyl-6-isopropyl-benzeneacetonitrile |
| 2-ethyl-5-(1,1,2,2-tetramethylpropyl)benzeneacetamide | chloromethylation | 3-chloromethyl-2-ethyl-5-(1,1,2,2-tetramethylpropyl)acetonitrile |
| 2,4,6-triisopropylbenzeneacetamide | chloromethylation | 3-chloromethyl-2,4,6-triisopropylbenzeneacetonitrile |

EXAMPLE 27

4-Chloromethyl-2,5-diisopropylbenzeneacetonitrile a. 4-Chloromethyl-2,5-diisopropylbenzyl Acetate A mixture of 26 parts of 2,5-diisopropyl-1,4-xylylene dichloride, 10 parts of potassium acetate, 50 parts of acetic acid and 5 parts of acetic anhydride is refluxed for 2 hours. Most of the acetic acid is distilled under reduced pressure and water is added to the residue. After stirring for several minutes at room temperature, the acetate is collected, washed with water and the crude product is recrystallized from petroleum ether to give 24 parts of 4-chloromethyl-2,5-diisopropylbenzyl acetate, melting at 87°–89°C.

b. 4-Cyanomethyl-2,5-diisopropylbenzyl Acetate

Five parts of sodium cyanide is added in small portions over a period of 0.5 hour to a mixture of 28 parts of 4-chloromethyl-2,5-diisopropylbenzyl acetate in 45 parts of dimethyl sulfoxide. The mixture is stirred an additional 0.5 hour at 65°C, cooled, and then diluted with 200 parts ice water. The essentially pure 4-cyanomethyl-2,5-diisopropylbenzyl acetate is collected by filtration and air dried.

c. 4-Cyanomethyl-2,5-diisopropylbenzyl Alcohol

To a mixture of 27 parts of the above benzyl acetate in 200 parts of methanol is added slowly a solution of potassium hydroxide (7.5 parts, 85% KOH) in a mixture of 13 parts of methanol and 5 parts water. As soon as the exothermic reaction has ceased, the resulting solution is refluxed 10 minutes. Part of the methanol is allowed to distill and the reaction mixture is diluted to 300 ml with cold water. The benzyl alcohol is collected, washed with cold water and air dried to give essentially pure 4-cyanomethyl-2,5-diisopropylbenzyl alcohol is nearly quantitative yield.

d. 4-Chloromethyl-2,5-diisopropylbenzeneacetonitrile

A solution of 12 parts of thionyl chloride in 12 parts of tetrahydrofuran is added dropwise over a period of 2 hours to a solution of 24 parts of 4-cyanomethyl-2,5-diisopropylbenzyl alcohol in 100 parts of tetrahydrofuran. The mixture is then stirred for 16 hours at room temperature, refluxed 0.5 hour, and then concentrated under reduced pressure. The residue is diluted with water and the crystals collected and air dried to afford essentially pure 4-chloromethyl-2,5-diisopropylbenzeneacetonitrile.

The following compounds are prepared as in Example 27 by substituting the indicated starting 1,4- and 1,3-xylylene dichlorides for the 2,5-diisopropyl-1,4-xylylene dichloride of Example 27.

TABLE XXXII

| Starting Material | Product |
|---|---|
| 2,5-diisobutyl-1,4-xylylenedichloride | 4-chloromethyl-2,5-diisobutylbenzeneacetonitrile |
| 2,5-diethyl-1,4-xylylenedichloride | 4-chloromethyl-2,5-diethylbenzeneacetonitrile |
| 2,5-di-tert-butyl-1,4-xylylenedichloride | 4-bromomethyl-2,5-di-tert-butylbenzeneacetonitrile |
| 2,5-diethyl-1,3-xylylenedichloride | 3-bromomethyl-2,5-diethylbenzeneacetonitrile |
| 2,5-di-n-propyl-1,3-xylylenedichloride | 3-chloromethyl-2,5-di-n-propylbenzeneacetonitrile |
| 2,5-di-tert-butyl-1,3-xylylenedichloride | 2,5-di-tert-butyl-3-chloromethylbenzeneacetonitrile |
| 4,6-diisopropyl-1,3-xylylenedichloride | 3-chloromethyl-4,5-diisopropylbenzeneacetonitrile |
| 4,6-di-tert-butyl-1,3-xylylenedichloride | 3-bromomethyl-4,6-di-tert-butylbenzeneacetonitrile |

EXAMPLE 28

3-Bromo-4-bromomethyl-2,5-diisopropylbenzeneacetonitrile

A mixture of 25 parts of 4-chloromethyl-2,5-diisopropylbenzeneacetonitrile (prepared as described in Example 27), 100 parts of carbon tetrachloride, and 1 part of iron powder is stirred and heated to 40°C. Eighteen parts of bromine dissolved in 12 parts of carbon tetrachloride is added dropwise over a period of 1 hour. The mixture is stirred for 7 hours at 50°C, filtered free of insoluble material and the filtrate is washed with a 10% sodium bisulfite solution. Evaporation of the solvent under reduced pressure followed by fractional distillation of the residue affords essentially pure 3-bromo-4-bromomethyl-2,5-diisopropylbenzeneacetonitrile.

The following compounds are prepared by appropriate substitution in the above procedure.

to afford essentially pure 4-bromo-3-chloromethyl-2,5-diisopropylbenzeneacetamide.

EXAMPLE 30

4-Bromo-3-chloromethyl-2,5-diisopropylbenzeneacetonitrile

Utilizing the procedure of Example 26, 4-bromo-3-chloromethyl-2,5-diisopropylbenzeneacetamide is dehydrated to yield 4-bromo-3-chloromethyl-2,5-diisopropylbenzeneacetonitrile.

The following compounds are prepared by substituting the indicated starting material for 4-bromo-2,5-diisopropylbenzeneacetamide in Example 30 and then either chloromethylating or bromomethylating. Subsequent dehydration as in Example 26 yields the listed product.

TABLE XXXIII

| Starting Material | Product |
|---|---|
| 5-tert-butyl-3-chloromethyl-2-ethylbenzeneacetonitrile | 5-tert-butyl-4-chloro-3-chloromethyl-2-ethylbenzeneacetonitrile |
| 4-bromomethyl-3-ethyl-5-isopropylbenzeneacetonitrile | 2-bromo-4-bromomethyl-3-ethyl-5-isopropylbenzeneacetonitrile |
| 4-chloromethyl-2,6-diisopropylbenzeneacetonitrile | 3-chloro-4-chloromethyl-2,6-diisopropylbenzeneacetonitrile |
| 4-chloromethyl-3,5-di-n-propylbenzeneacetonitrile | 2-chloro-4-chloromethyl-3,5-di-n-propylbenzeneacetonitrile |
| 5-chloromethyl-2,4-diethylbenzeneacetonitrile | 3-bromo-5-bromomethyl-2,4-diethylbenzeneacetonitrile |
| 3-chloromethyl-2,4,6-triethylbenzeneacetonitrile | 5-chloro-3-chloromethyl-2,4,6-triethylbenzeneacetonitrile |
| 4-chloromethyl-2,5-diisopropylbenzeneacetonitrile | 3,6-dibromo-4-bromomethyl-2,5-diisopropylbenzeneacetonitrile |
| 4-bromomethyl-2,5-diisopropylbenzeneacetonitrile | 3-bromo-4-bromomethyl-2,5-diisopropylbenzeneacetonitrile |
| 4-chloromethyl-3,5-diisobutyl-α-methylbenzeneacetonitrile | 2-chloro-4-chloromethyl-3,5-diisobutyl-α-methylbenzeneacetonitrile |
| 3-chloromethyl-2-ethyl-5-tert-pentylbenzeneacetonitrile | 4,6-dichloro-3-chloromethyl-2-ethyl-5-tert-pentylbenzeneacetonitrile |
| 4-chloromethyl-3-ethyl-5-(1,1,2,2-tetramethyl)-benzeneacetonitrile | 2-chloro-4-chloromethyl-3-ethyl-5-(1,1,2,2-tetra methyl)benzeneacetonitrile |
| 4-bromomethyl-2,6-diisopropylbenzeneacetonitrile | 3,5-dibromo-4-bromomethyl-2,6-diisopropylbenzene acetonitrile |
| 4-chloromethyl-3,5-diethylbenzeneacetonitrile | 2,6-dichloro-4-chloromethyl-3,5-diethylbenzeneacetonitrile |
| 3-bromo-2,4,6-triethyl-α,α-dimethylbenzeneacetonitrile | 5-bromo-3-bromomethyl-2,4,6-triethyl-α,α-dimethylbenzeneacetonitrile |

EXAMPLE 29

4-Bromo-3-chloromethyl-2,5-diisopropylbenzeneacetamide

Fifty parts of 4-bromo-2,5-diisopropylbenzeneacetamide, prepared by hydrolysis of 4-bromo-2,5-diisopropylbenzeneacetonitrile (described in Example 28) by the method of Wenner, J. Org. Chem., 15, 548 (1950) is mixed with 23 parts of paraformaldehyde and

TABLE XXXIV

| Starting Material | Procedure | Product |
|---|---|---|
| 4-bromo-2,5-diethylbenzeneacetamide | chloromethylation | 4-bromo-3-chloromethyl-2,5-diethylbenzeneacetonitrile |
| 5-bromo-2,4-diisopropylbenzeneacetamide | bromomethylation | 5-bromo-3-bromomethyl-2,4-diisopropylbenzeneacetonitrile |
| 4-bromo-5-tert-butyl-2-ethylbenzeneacetamide | chloromethylation | 4-bromo-5-tert-butyl-3-chloromethyl-5-ethylbenzeneacetonitrile |
| 2-tert-butyl-5-chloro-4-isobutylbenzeneacetamide | chloromethylation | 2-tert-butyl-5-chloro-3-chloromethyl-4-isobutylbenzeneacetonitrile |
| 2,4-dichloro-3,6-diisopropylbenzeneacetamide | chloromethylation | 2,4-dichloro-5-chloromethyl-3,6-diisopropylbenzeneacetonitrile |
| 3,5-dichloro-2,6-diethylbenzeneacetamide | bromomethylation | 4-bromomethyl-3,5-dichloro-2,6-diethylbenzeneacetonitrile |

12 parts of zinc chloride. A stream of dry hydrogen chloride is passed into the stirred mixture. After heating at 65°C for 3 hours, an additional 9 parts of paraformaldehyde and 9 parts of zinc chloride is added and the reaction continued at 75°C for a total of 6.5 hours. The reaction mixture is then diluted with 150 parts of ice, the crystals are collected, washed with ice water and cold (−15°C) pentane. The crystals are dissolved in methylene chloride and washed with three portions of dilute hydrochloric acid, dried with anhydrous magnesium sulfate and concentrated under reduced pressure

COMPOSITIONS

The compounds of Formula (1) can be formulated for herbicidal use in conventional ways. The formulations can be wettable powders, dusts, suspensions in water and/or organic solvents, solutions, emulsifiables, high-strength compositions, pellets, or granules. The other herbicides listed above can be tank-mixed with the compounds of Formula (1) in the form of finished formulations or they can be combined to give single formulations for reasons of convenience. The formulations will include inert carrier materials and/or surfactants which serve as wetting, emulsifying and/or dispersing agents. Anionic or nonionic surfactants are preferred; lists of suitable surfactants can be found in "Detergents and Emulsifiers Annual" (1971) by John W. McCutcheon, Inc. The formulations will contain about 2 to 99% by weight, of active compound or compounds, up to about 20% by weight of a surfactant, and/or up to about 98% by weight of inert solid or liquid carrier. For dusts, 2 to 25% of active compound can be used, for granules or pellets 5–50%, for solutions or suspensions 10–50%, for wettable powders 20–90%, and high-strength compositions 90–99%. In some instances the surfactant can be used at up to 5 times the amount of active ingredient to improve the effectiveness of the active compound. This amount of surfactant is most conveniently applied as a tank mix with the active component.

Organic liquids suitable for preparation of solutions, suspensions, and emulsifiable concentrates containing the compounds of Formula (1) include alcohols, glycols, mono- and dialkyl ethers of ethylene glycol and diethylene glycol, ketones, esters, sulfamides, amides, paraffinic hydrocarbons, aromatic hydrocarbons, and halogenated hydrocarbons. Liquids containing hydroxy or amino groups may react in storage with halomethyl aromatic compounds, so for best stability this combination should be avoided. At normal levels surfactants containing a small proportion of hydroxyl groups (e.g., polyethylene glycol ethers) react surprisingly little. Choice of a liquid is dictated by the reactivity, the solubility of the active compound to be used and whether a suspension or solution is desired. In general, compounds of Formula (1) are insufficiently soluble in water to permit aqueous solution formulations.

Solid, inert carrier materials suitable for wettable powders, pellets and granules include natural clays, synthetic fine silicas, and other materials commonly used for this purpose.

Further formulations concerning the preparation of herbicidal formulations can be found in U.S. Pat. No. 3,235,357 and in the following sections A through D.

A. WETTABLE POWDERS

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the active compounds are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed by J. W. McCutcheon in "Detergents and Emulsifiers" 1971 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, amines or acid amides, long-chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, lignin sulfonates, polymeric alkylnaphthalene sulfonates, sodium naphthalenesulfonate, polymethylene bisnaphthalenesulfonate, and sodium N-methyl-N-(long-chain acid) taurates.

Wetting and dispersing agents in these preferred wettable powder compositions of this invention are usually present at concentrations of from about 0.25 weight per cent to 5 weight per cent. The inert extender then completes the formulation. Where needed, 0.1 weight per cent to 1.0 weight per cent of the extender may be replaced by a corrosion inhibitor or an anti-foaming agent or both.

Thus, wettable powder formulations of the invention will contain from about 20 to 90 weight per cent active material, from 0.5 to 3.0 weight per cent wetting agent, from 0.25 to 5.0 weight per cent dispersant, and from 9.25 to 79.25 weight per cent inert extender, as these terms are described above.

Wettable powders can conveniently be produced by blending the ingredients in conventional blenders, followed by grinding the mixture one or more times in a hammer mill, pin mill, fluid energy mill or the like. Particle size classifiers may be used to remove over-size material for further grinding. It is usually desirable to reblend after milling and to sift out flakes and debris before packaging.

B. HIGH-STRENGTH COMPOSITIONS AND AQUEOUS AND OIL SUSPENSION CONCENTRATES

High-strength compositions generally consist of 90 to 99% active ingredient and 1.0 to 10% of a solid, inert, absorptive diluent or a liquid or solid surfactant such as those described by McCutcheon in "Detergents and Emulsifiers" 1971 Annual. Such high-strength compositions can often be used in a manner similar to the wettable powders but they are also suitable for further formulation.

The aqueous suspension concentrates are prepared by mixing together and sandgrinding an aqueous slurry of waterinsoluble active ingredient in the presence of dispersing agents. Thus there is obtained a concentrated slurry of very finely divided particles in which the active ingredient is substantially all below 10 microns in size. This concentrated aqueous suspension is characterized by its extremely small particle size so that upon diluting and spraying, a very uniform coverage is obtained.

These aqueous suspension concentrates will contain from 10 to 50% of active ingredient, from 45 to 70% water with the remainder made up of surfactants, corrosion inhibitors, and suspending agents.

Suspensions in organic liquids can be prepared in a similar manner such as by replacing the water with mineral oil.

C. SOLUTIONS AND EMULSIFIABLE OILS

Emulsifiable oils are usually solutions of active material in non-water miscible solvents together with a surfactant. Omission of the surfactant gives a solution which can be applied by low volume techniques or diluted with weed oils.

For the compounds of this invention, emulsifiable oils can be made by mixing the active ingredient with a solvent and surfactant. Suitable solvents for the compounds of this invention are aromatic hydrocarbons including many weed oils, chlorinated solvents, and non-water miscible ethers, esters, or ketones. Suitable surfactants are those anionic or non-ionic agents known to the art as emulsifying agents. Such compounds can be found listed in "Detergents and Emulsifiers" 1971 Annual by John W. McCutcheon, Inc.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty acid esters, polyethylene glycol esters with fatty or rosin acids, fatty alkylol amide condensates, calcium and amine salts of fatty alcohol sulfates, oil soluble petroleum sulfonates or, preferably, mixtures of these emulsifying agents. Such emulsifying agents will comprise from about 1 to 10 weight per cent of the total composition. As described above, however, up to 5 parts of emulsifying agent for each part of active compound can be used.

Thus, emulsifiable oil compositions of the present invention will consist of from about 10 to 50 weight per cent active material, about 40 to 89 weight per cent solvent, and about 1 to 10 weight per cent emulsifier, as these terms are defined and used above.

In some instances the oil solution may be intended merely for extension with other oils, such as weed oils or for low volume application. In this instance the emulsifying agents may be omitted and may be replaced by additional solvent.

D. GRANULES AND PELLETS

Granules and pellets are physically stable, particulate compositions containing the active compounds which adhere to or are distributed through a basic matrix of a coherent, inert carrier with macroscopic dimensions. In order to aid leaching of the active ingredient from the granule or pellet, a surfactant can be present.

For the compounds of this invention, the inert carrier is preferably of mineral origin, and the surfactant is a compound known to the art as a wetting agent. Such compounds are listed by J. W. McCutcheon in "Detergents and Emulsifiers" 1971 Annual.

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight per cent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with up to 50 weight per cent active component, but more frequently a concentration of about 10 weight per cent is desired for optimum distribution. The granular compositions of this invention are most useful in a size range of 15–80 mesh (1.3–0.18 mm).

The most suitable surfactants for the granular compositions of this invention depend upon the type of granule used. When preformed granules are sprayed with active material in liquid form the most suitable surfactants are nonionic, liquid wetters miscible with the solvent. These are compounds more generally known to the art as emulsifiers, and comprise alkylaryl polyether alcohols, alkyl polyether alcohols, polyoxyethylene sorbitan fatty acid esters, polyethylene glycol esters with fatty or rosin acids, fatty alkylol amide condensates, oil soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid nonionic wetters can still be used, but it is usually preferable to incorporate at the mixing stage one of the solid, powdered anionic wetting or dispersing agents such as those previously listed for the wettable powders. Such agents will comprise from about 0 to 2 weight percent of the total composition.

Thus, the preferred granular or pelleted formulations of this invention comprise about 5 to 30 weight percent active material, about 0 to 5 weight percent surfactant, and about 65 to 95 weight percent inert mineral carrier, as these terms are used herein.

Some preferred herbicidal compositions and methods of this invention are illustrated by the following examples, wherein all parts, proportions, and percentages are by weight unless indicated otherwise.

EXAMPLE A

| | |
|---|---|
| 2-sec-butyl-5-tert-butyl-3-chloro-benzeneacetonitrile | 20% |
| diatomaceous earth | 63% |
| methylated cellulose | 1% |
| dioctyl sodium sulfosuccinate | 1% |
| synthetic silica | 15% |

The above ingredients are blended, hammer-milled to pass an 0.25 mm screen and reblended.

Eight kilograms of this formulation plus 1.25 kilograms of 80% wettable powder atrazine are suspended in 350 liters of water and applied preemergence to a hectare of corn planted in a Flanagan silt loam soil. Excellent control of a broad spectrum of broadleaf and grass weeds results without corn injury. The corn produces excellent yields.

EXAMPLE B

| | |
|---|---|
| 4-bromo-2,5-diisopropylbenzene-acetonitrile | 25% |
| xylene | 65% |
| blend of nonylphenoxy polyethylene glycol ethers and alkylaryl-sulfonates | 10% |

The above ingredients are agitated in a blender with warming until a homogeneous, emulsifiable solution results.

4-Bromomethyl-2,5-di-tert-butylbenzeneacetonitrile can be formulated in like manner.

Twenty liters of the above formulation are emulsified in 300 liters of water and sprayed preemergence to a hectare of corn planted on a Norfolk sandy loam soil. The treatment controls many weedy grasses and several broadleaf weeds, thereby allowing the corn to grow without serious weed competition and to produce an excellent corn yield.

EXAMPLE C

| | |
|---|---|
| 3-bromo-2-sec-butyl-5-tert-butylbenzeneacetonitrile | 33% |
| isophorone | 27% |
| aromatic naphtha | 30% |
| polyethylene glycol laurate | 5% |
| oil-soluble calcium alkyl aryl sulfonate | 5% |

The above ingredients are homogenized by stirring in a blender to yield an emulsifiable concentrate.

Ten kilograms of the above formulation are emulsified in fifty liters of water and applied preemergence by airplane to a hectare of wheat. Several weedy grasses are controlled, allowing the wheat to grow and produce an excellent yield.

EXAMPLE D

| | |
|---|---|
| 4-chloro-2,5-diisopropylbenzene-acetonitrile | 20% |
| trimethynonyl polyethylene glycol ether | 40% |
| xylene | 20% |
| isophorone | 20% |

The above ingredients are warmed in a blender with stirring until a homogeneous, emulsifiable solution results.

Thirty liters of the above formulation are dispersed in 400 liters of water and sprayed behind the press wheel of a tractor-mounted corn planter on a band 33 mm wide, covering about 33,000 row meters. The corn emerges to a good stand and grows vigorously without competition from crabgrass (Digitaria spp.), pigweed (Amaranthus spp.), barnyardgrass (*Echinochloa crusgalli* L.), and foxtail (Setaria spp.) which are controlled in the row by the herbicide treatment. Weeds in the middles are controlled by cultivation. A good yield of corn results.

EXAMPLE E

| | |
|---|---|
| 4-bromo-2,5-diisopropylbenzene-acetonitrile | 5% |
| attapulgite granules (15–30 mesh) | 90% |
| dimethylformamide | 5% |

A 50% solution of the active ingredient in dimethylformamide is prepared by warming the two materials with stirring. This solution is then sprayed on the granules which are tumbled in a blender. The granules so prepared are suitable for application without removal of solvent.

One hundred kilograms of these granules are distributed preemergence over a hectare of soybeans planted in Commerce silt loam soil. Good control of crabgrass, barnyardgrass, signalgrass (Brachiaria spp.) and other weeds results. The soybeans grow to maturity and produce a good yield.

EXAMPLE F

| | |
|---|---|
| 2-sec-butyl-5-butyl-3-chloro-benzeneacetonitrile | 10% |

EXAMPLE F-continued

| | |
|---|---|
| calcium lignin sulfonate plus wood sugars | 15% |
| kaolinite clay | 64% |
| sodium sulfate | 10% |
| sodium lauryl sulfate | 1% |

The above ingredients are ground to pass a 0.3 mm screen, blended, moistened with water, extruded and cut into pellets. After drying, these pellets can be applied directly or they can be further subdivided into 30–60 mesh (0.25–0.59 mm) granules for more uniform application. All compounds of this invention can be formulated in like manner.

Sixty kilograms of these pellets are distributed over a hectare of rice concurrent with water seeding of the rice. The rice emerges and grows vigorously, free of competition by barnyardgrass, sprangletop (Leptochloa spp.) and other grasses controlled by the herbicide treatment. A good rice yield results.

EXAMPLE G

| | |
|---|---|
| 4-chloromethyl-2,5-diisopropylbenzene-acetonitrile | 92% |
| trimethylnonyl polyethylene glycol ether | 8% |

The above ingredients are blended to form a high-strength concentrate. This composition can be used directly or as a source of active ingredient for other formulations.

The above formulation is tank-mixed with silvex to provide 12 kilograms of the above compound with 4 kilograms of silvex in 500 liters of water. The mixture is applied at 200 liters per hectare to sugarcane immediately after shaving and off-barring to control many broadleaf and grass weeds. The sugarcane grows vigorously to harvest.

EXAMPLE H

| | |
|---|---|
| 4-chloro-2,5-diisopropylbenzene-acetonitrile | 35% |
| octylphenyl polyethylene glycol ether | 2% |
| dimethylformamide | 63% |

The above ingredients are stirred together to produce a solution suitable for low-volume application.

Ten liters of the above formulation are mixed with 20 liters of water and sprayed by aircraft on a hectare of Kentucky bluegrass turf at a sod farm in the spring to control crabgrass, foxtail, barnyardgrass, and annual bluegrass (*Poa annua*). Excellent sod results.

EXAMPLE I

| Mixtures | |
|---|---|
| 4-bromo-2,5-diisopropylbenzene-acetonitrile | 30% |
| S-ethyl hexahydro-1-H-azepine-1-carbothioate (molinate) | 15% |
| chlorobenzene | 50% |
| blend of oil-soluble calcium alkyl-arylsulfonates with alkyl aryl polyethylene glycol ethers | 5% |

The above ingredients are stirred with warming in a blender until a homogeneous, emulsifiable solution is formed.

Twenty kilograms of the above formulation are emulsified in 350 liters of water and sprayed on a hectare of Perry clay soil. The treatment is incorporated into the top two or three inches by double disking the area just prior to dry-seeding rice and several days before flooding. The crop emerges to a good stand and grows vigorously without competition from such troublesome weeds as sprangletop (Leptochloa spp.), barnyardgrass (*Echinochloa crus-galli*), junglerice (*Echinochloa colonum*), ducksalad (*Heteranthera limosa*) and dayflower (*Commeling communis*).

EXAMPLE J

| | |
|---|---|
| 3-bromo-2-sec-butyl-5-tert-butyl-benzeneacetonitrile | 10% |
| "Ordram" 63 (molinate)* | 6% |
| attapulgite granules (24–48 mesh) | 73% |
| dimethylformamide | 11% |

*S-ethyl hexahydro-1-H-azepine-1-carbothioate

The active ingredients are dissolved in the dimethylformamide with stirring, and the solution is sprayed on the granules which are tumbled in a mixer. The granules are then screened to remove fines and packaged.

Forty kilograms of these granules are distributed uniformly by aircraft on a hectare of flooded, waterseeded rice after the rice and weeds have emerged, but before the weeds are four inches tall. Good control of barnyardgrass, ducksalad, junglerice and sprangletop is obtained. The rice matures and produces a good grain yield.

EXAMPLE K

| | |
|---|---|
| 4-bromo-2,5-diisopropylbenzene-acetonitrile | 15% |
| 3-(3,4-dichlorophenyl)-1-methoxy-1-methylurea (linuron) | 15% |
| isophorone | 64% |
| blend of nonylphenoxy polyethylene glycol ethers and alkylaryl-sulfonates | 6% |

The above ingredients are blended with warming to form a homogeneous, emulsifiable concentrate.

Eight kilograms of the above formulation are emulsified in 400 liters of water and sprayed preemergence on a hectare of soybeans planted in Sassafras sandy loam soil. The treated area remains free of ragweed (Ambrosia spp.), pigweed (Amaranthus spp.), crabgrass (Digitaria spp.), foxtail (Setaria spp.) and barnyardgrass (*Echinochloa crus-galli*) for the entire season. Good yields of high-quality soybeans result.

EXAMPLE L

| | |
|---|---|
| 10% granular formulation of "Amiben"* | 33% |
| 5% granular formulation of Example E | 67% |

*3-amino-2,5-dichlorobenzoic acid

The above granules are tumbled in a mixer and packaged.

One hundred kilograms of the above granules are distributed preemergence on a hectare of Norfolk sandy loam soil planted to pumpkins and squash. Crabgrass, foxtail, barnyardgrass, goosegrass, pigweed and smartweed are controlled, thereby allowing the squash and pumpkins to mature and yield a good crop of marketable produce.

EXAMPLE M

| | |
|---|---|
| formulation of Example B | 75% |
| 2,4-D, Butyl ester, emulsifiable formulation | 25% |

The above ingredients are blended to form a homogeneous, emulsifiable concentrate.

Eighteen liters of the above formulation are emulsified in 320 liters of water and sprayed in early spring on a hectare of established Kentucky bluegrass turf. Dandelions (*Taraxacum officinale*), plantain (Plantago spp.), crabgrass (Digitaria spp.) and foxtail (Setaria spp.) are controlled. An attractive, uniform bluegrass lawn results.

EXAMPLE N

| | |
|---|---|
| formulation of Example I. | 70% |
| "Stam" F-34* | 30% |

*Commercial formulation containing 3 lbs/gal of 3,4-dichloropropionanilide

The above formulations are blended to yield an emulsifiable concentrate.

Thirty liters of the above formulation are emulsified in 400 liters of water and sprayed uniformly on a hectare of drill-planted rice that had just emerged along with the weeds. Four days later the area is flooded to a depth of about 5 inches. The rice grows vigorously. The weeds are controlled and a good grain yield results.

I claim:
1. The compound 4-bromo-2,5-diisopropylbenzeneacetonitrile.
2. The compound 4-bromo-2-tert-butyl-5-isopropylbenzeneacetonitrile.
3. The compound 4-chloro-2,5-diisopropylbenzeneacetonitrile.

* * * * *